US009847930B2

(12) United States Patent
Garcia-Luna-Aceves et al.

(10) Patent No.: US 9,847,930 B2
(45) Date of Patent: Dec. 19, 2017

(54) SYSTEM AND METHOD FOR DIRECTING CLIENTS TO OPTIMAL SERVERS IN COMPUTER NETWORKS

(71) Applicants: Jose J. Garcia-Luna-Aceves, San Mateo, CA (US); Srinivas Vutukury, San Jose, CA (US)

(72) Inventors: Jose J. Garcia-Luna-Aceves, San Mateo, CA (US); Srinivas Vutukury, San Jose, CA (US)

(73) Assignee: Adara Networks, Inc., San Jose, CA (US)

( * ) Notice: Subject to any disclaimer, the term of this patent is extended or adjusted under 35 U.S.C. 154(b) by 553 days.

(21) Appl. No.: 13/873,200

(22) Filed: Apr. 29, 2013

(65) Prior Publication Data

US 2013/0311674 A1   Nov. 21, 2013
US 2016/0359722 A9   Dec. 8, 2016

Related U.S. Application Data

(60) Division of application No. 12/645,443, filed on Dec. 22, 2009, now Pat. No. 8,433,787, which is a division
(Continued)

(51) Int. Cl.
*G06F 15/173*   (2006.01)
*H04L 12/721*   (2013.01)
(Continued)

(52) U.S. Cl.
CPC .......... *H04L 45/12* (2013.01); *G06F 12/1483* (2013.01); *G06F 17/30902* (2013.01);
(Continued)

(58) Field of Classification Search
None
See application file for complete search history.

(56) References Cited

U.S. PATENT DOCUMENTS 5,088,032 A   2/1992   Bosack
5,115,495 A   5/1992   Tsuchiya et al.
(Continued)

FOREIGN PATENT DOCUMENTS

EP   0 817 444 A2   1/1998
EP   0 959 601 A1   11/1999
(Continued)

OTHER PUBLICATIONS

T. Berners-Lee, "Information Management: A Proposal," CERN Document, (Mar. 1989, May 1990).
(Continued)

*Primary Examiner* — Padma Mundur
(74) *Attorney, Agent, or Firm* — Blakely, Sokoloff, Taylor & Zafman LLP

(57) ABSTRACT

A communication protocol includes one or more messages passed between Web routers over a reliable transmission protocol used for inter-Web router communication. These messages include information that allows the Web routers to dynamically update mappings of client addresses or address ranges to information object repository addresses based on client-to-server distance and server load. The mappings are preferably optimal mappings of the client addresses or address ranges to the information object repository addresses and the messages report updated distances from these information object repository addresses to the client addresses or address ranges. For example, the messages may report, for each updated distance, an associated client address or address range and/or an associated anchor address of a Web router co-located with an information object repository that is the subject of the message.

6 Claims, 9 Drawing Sheets

Related U.S. Application Data of application No. 10/241,321, filed on Sep. 10, 2002, now Pat. No. 7,664,876, which is a continuation-in-part of application No. 09/810,148, filed on Mar. 15, 2001, now Pat. No. 7,162,539.

(60) Provisional application No. 60/323,126, filed on Sep. 10, 2001, provisional application No. 60/322,899, filed on Sep. 10, 2001, provisional application No. 60/190,331, filed on Mar. 16, 2000, provisional application No. 60/200,401, filed on Apr. 28, 2000.

(51) Int. Cl.
*G06F 12/14* (2006.01)
*G06F 17/30* (2006.01)
*H04L 12/18* (2006.01)
*H04L 29/12* (2006.01)
*H04L 29/08* (2006.01)
*H04L 12/26* (2006.01)

(52) U.S. Cl.
CPC ........ *H04L 12/18* (2013.01); *H04L 29/12009* (2013.01); *H04L 43/0805* (2013.01); *H04L 43/0852* (2013.01); *H04L 61/1582* (2013.01); *H04L 67/101* (2013.01); *H04L 67/1002* (2013.01); *H04L 67/1006* (2013.01); *H04L 67/1008* (2013.01); *H04L 67/1014* (2013.01); *H04L 67/1023* (2013.01); *H04L 67/1038* (2013.01); *H04L 67/2842* (2013.01)

(56) References Cited

U.S. PATENT DOCUMENTS

| | | | |
|---|---|---|---|
| 5,606,596 A | 2/1997 | Jain et al. | |
| 5,774,660 A | 6/1998 | Brendel et al. | |
| 5,774,668 A | 6/1998 | Choquier et al. | |
| 5,822,320 A | 10/1998 | Horikawa et al. | |
| 5,828,665 A * | 10/1998 | Husak | 370/395.53 |
| 5,859,966 A | 1/1999 | Hayman et al. | |
| 6,003,030 A | 12/1999 | Kenner et al. | |
| 6,006,264 A | 12/1999 | Colby et al. | |
| 6,012,067 A | 1/2000 | Sarkar | |
| 6,012,068 A | 1/2000 | Boezeman et al. | |
| 6,034,946 A | 3/2000 | Roginsky et al. | |
| 6,047,330 A | 4/2000 | Stracke | |
| 6,052,718 A | 4/2000 | Gifford | |
| 6,092,178 A | 7/2000 | Jindal et al. | |
| 6,097,718 A | 8/2000 | Bion | |
| 6,098,108 A | 8/2000 | Sridhar et al. | |
| 6,108,703 A | 8/2000 | Leighton et al. | |
| 6,115,742 A | 9/2000 | Franklin et al. | |
| 6,115,752 A | 9/2000 | Chauhan | |
| 6,130,881 A | 10/2000 | Stiller et al. | |
| 6,138,162 A | 10/2000 | Pistriotto et al. | |
| 6,154,777 A | 11/2000 | Ebrahim | |
| 6,167,438 A | 12/2000 | Yates et al. | |
| 6,167,444 A * | 12/2000 | Boden | H04L 12/4604 709/223 |
| 6,175,869 B1 | 1/2001 | Ahuja et al. | |
| 6,182,224 B1 | 1/2001 | Phillips et al. | |
| 6,185,619 B1 | 2/2001 | Joffe et al. | |
| 6,189,043 B1 | 2/2001 | Buyukkoc et al. | |
| 6,201,794 B1 | 3/2001 | Stewart et al. | |
| 6,205,477 B1 | 3/2001 | Johnson et al. | |
| 6,205,481 B1 | 3/2001 | Heddaya et al. | |
| 6,236,652 B1 | 5/2001 | Preston et al. | |
| 6,249,801 B1 | 6/2001 | Zisapel et al. | |
| 6,256,675 B1 | 7/2001 | Rabinovich | |
| 6,266,706 B1 | 7/2001 | Brodnik et al. | |
| 6,298,381 B1 | 10/2001 | Shah et al. | |
| 6,304,913 B1 | 10/2001 | Rune | |
| 6,314,088 B1 | 11/2001 | Yamano | |
| 6,314,465 B1 | 11/2001 | Paul et al. | |
| 6,317,778 B1 | 11/2001 | Dias et al. | |
| 6,327,252 B1 | 12/2001 | Silton et al. | |
| 6,327,622 B1 | 12/2001 | Jindal et al. | |
| 6,377,551 B1 | 4/2002 | Luo et al. | |
| 6,397,246 B1 | 5/2002 | Wolfe | |
| 6,400,681 B1 | 6/2002 | Bertin et al. | |
| 6,405,252 B1 | 6/2002 | Gupta et al. | |
| 6,415,323 B1 | 7/2002 | McCanne et al. | |
| 6,438,652 B1 | 8/2002 | Jordan et al. | |
| 6,449,647 B1 | 9/2002 | Colby et al. | |
| 6,553,376 B1 | 4/2003 | Lewis et al. | |
| 6,574,609 B1 | 6/2003 | Downs et al. | |
| 6,574,663 B1 | 6/2003 | Bakshi et al. | |
| 6,577,609 B2 | 6/2003 | Sharony | |
| 6,578,066 B1 | 6/2003 | Logan et al. | |
| 6,601,098 B1 | 7/2003 | Case et al. | |
| 6,611,872 B1 | 8/2003 | McCanne | |
| 6,646,989 B1 | 11/2003 | Khotimsky et al. | |
| 6,687,731 B1 | 2/2004 | Kavak | |
| 6,708,187 B1 | 3/2004 | Shanumgam | |
| 6,721,291 B1 | 4/2004 | Bergenwall et al. | |
| 6,735,633 B1 | 5/2004 | Welch et al. | |
| 6,741,585 B1 | 5/2004 | Munoz et al. | |
| 6,785,704 B1 | 8/2004 | McCanne | |
| 6,820,132 B1 | 11/2004 | Puente et al. | |
| 6,820,133 B1 | 11/2004 | Grove et al. | |
| 6,917,985 B2 | 7/2005 | Madruga et al. | |
| 6,965,938 B1 | 11/2005 | Beasley et al. | |
| 7,020,083 B2 | 3/2006 | Garcia-Luna-Aceves et al. | |
| 7,162,539 B2 | 1/2007 | Garcie-Luna-Aceves | |
| 7,200,111 B2 | 4/2007 | Garcia-Luna-Aceves et al. | |
| 7,213,062 B1 | 5/2007 | Raciborski et al. | |
| 7,343,422 B2 | 3/2008 | Garcia-Luna-Aceves et al. | |
| 7,359,985 B2 | 4/2008 | Grove et al. | |
| 7,392,325 B2 | 6/2008 | Grove et al. | |
| 7,418,518 B2 | 8/2008 | Grove et al. | |
| 7,552,233 B2 | 6/2009 | Raju et al. | |
| 7,565,450 B2 | 7/2009 | Garcia-Luna-Aceves et al. | |
| 7,577,754 B2 | 8/2009 | Garcia-Luna-Aceves et al. | |
| 7,664,876 B2 | 2/2010 | Garcia-Luna-Aceves et al. | |
| 7,725,596 B2 | 5/2010 | Garcia-Luna-Aceves et al. | |
| 7,908,337 B2 | 3/2011 | Garcia-Luna-Aceves et al. | |
| 8,423,666 B2 | 4/2013 | Garcia-Luna-Aceves et al. | |
| 8,433,787 B2 | 4/2013 | Garcia-Luna-Aceves et al. | |
| 8,572,214 B2 | 10/2013 | Garcia-Luna-Aceves | |
| 2001/0056416 A1 | 12/2001 | Garcia-Luna-Aceves | |
| 2002/0004846 A1 | 1/2002 | Garcia-Luna-Aceves et al. | |
| 2002/0007413 A1 | 1/2002 | Garcia-Luna-Aceves et al. | |
| 2002/0010737 A1 | 1/2002 | Garcia-Luna-Aceves et al. | |
| 2002/0016860 A1 | 2/2002 | Garcia-Luna-Aceves et al. | |
| 2002/0026511 A1 | 2/2002 | Garcia-Luna-Aceves et al. | |
| 2002/0028656 A1 | 3/2002 | Yemini et al. | |
| 2002/0071430 A1 * | 6/2002 | Szyszko | H04L 45/02 370/389 |
| 2002/0133537 A1 | 9/2002 | Lau et al. | |
| 2002/0163889 A1 | 11/2002 | Yemini et al. | |
| 2003/0023750 A1 | 1/2003 | Basturk | |
| 2003/0091029 A1 | 5/2003 | Jo et al. | |
| 2003/0101278 A1 | 5/2003 | Garcia-Luna-Aceves | |
| 2003/0200307 A1 | 10/2003 | Raju et al. | |
| 2003/0235155 A1 | 12/2003 | Boivie et al. | |
| 2004/0039820 A1 | 2/2004 | Colby et al. | |
| 2006/0271705 A1 | 11/2006 | Garcia-Luna-Aceves | |
| 2010/0198913 A1 | 8/2010 | Garcia-Luna-Aceves et al. | |
| 2011/0093586 A1 | 4/2011 | Garcia-Luna-Aceves et al. | |

FOREIGN PATENT DOCUMENTS

| | | |
|---|---|---|
| EP | 1 017 204 A2 | 7/2000 |
| EP | 0 817 444 A3 | 12/2000 |
| EP | 1 391 096 B1 | 2/2008 |
| EP | 1 433 051 BI | 1/2016 |
| EP | 1 440 529 B1 | 8/2016 |
| WO | WO 98/26559 A1 | 6/1998 |
| WO | WO 98/57275 A2 | 12/1998 |
| WO | WO9857275 * | 12/1998 |
| WO | WO 99/06913 A1 | 2/1999 |
| WO | WO 99/40514 A1 | 8/1999 |
| WO | WO 01/18641 A1 | 3/2001 |

(56) References Cited

FOREIGN PATENT DOCUMENTS

| WO | WO 01/33805 A2 | 5/2001 |
|---|---|---|
| WO | WO 01/57693 A1 | 8/2001 |
| WO | WO 01/58069 A1 | 8/2001 |
| WO | WO 01/69457 A2 | 9/2001 |
| WO | WO 03/023607 A1 | 3/2003 |
| WO | WO 03/023639 A1 | 3/2003 |

OTHER PUBLICATIONS

Ari Luotonen, Henrik Frystyk Nielsen, and Tim Berbers-Lee. Cern httpd. http://www.w3.org/Daemon, Jul. 1996.
W.W. Chu, "Optimal File Allocation in a Multiple Computer System," IEEE Transactions on Computers, Oct. 1969.
S. Mahmoud and J.S. Riordon, "Optimal Allocation of Resources in Distributed Information Networks," ACM Transactions on Data Base Systems, vol. 1, No. 1, pp. 80-7S (Mar. 1976).
H.L. Morgan and K.D. Levin, "Optimal Program and Data Locations in Computer Networks," Communications of the ACM, vol. 20, No. 5, May 1977.
W.W. Chu, "Performance of File Directory Systems for Data Bases in Star and Distributed Networks," Proc. National Computer Conference, 1976, pp. 577-587.
D. Small and W.W. Chu, "A Distributed Data Base Architecture for Data Processing in a Dynamic Environment," Proc. COMPCON 79 Spring.
G. Chiu, C.S. Rahgavendra, and S.M. Ng, "Resource Allocation with Load Balancing Consideration in Distributed Computing Systems," Proc. IEEE INFOCOM 89, Ottawa, Ontario, Canada, Apr. 1989, pp. 758-765.
J.D. Guyton and M.F. Schwartz, "Locating Nearby Replicated Internet Servers," Technical Report CU-CS-762-95, Department of Computer Science, University of Colorado-Coulder, Feb. 1995.
J.D. Guyton and M.F. Schwartz, "Locating Nearby Replicated Internet Servers," Proc. ACM SIGCOMM 95 Conference, Cambridge, Massachusetts, pp. 288-298 (Aug. 1995).
A. Duda and M.A. Sheldon, "Content Routing in Networks of WAIS Servers," Proc. IEEE 14th International Conference on Distributed Computing Systems, Jun. 1994.
M.A. Sheldon, A. Duda, R. Weiss, J.W. O'Toole, Jr., and D.K. Gifford, "A Content Routing System for Distributed Information Servers," Proc. Fourth International Conference on Extending Database Technology, Mar. 1994.
A. Chankhunthod, P. Deming, C. Neerdaels, M. Schwartz, and K. Worrell, "A Hierarchical Internet Object Cache," Proc. USENIX Technical Conference 96, San Diego, California, Jan. 1996.
D. Wessels, "Squid Internet Object Cache," http://www.squid-cache.org/, Aug. 1998.
D. Wessels and K. Claffy, "Internet Cache Protocol (ICP), Version 2," RFC 2186, Sep. 1997.
A. Heddaya and S. Mirdad, "WebWave: Globally Load Balanced Fully Distributed Caching of Hot Published Documents," Proc. IEEE 17th International Conference on Distributed Computing Systems, Baltimore, Maryland, May 1997.
K.W. Ross, "Hash Routing for Collections of Shared Web Caches," IEEE Network, vol. 11, No. 6, Nov. 1997, pp. 37-44.
D.G. Thaler and C.V. Ravishankar, "Using Name-Based Mappings to Increase Hit Rates," IEEE/ACM Transaction on Networking, vol. 6, No. 1 (Feb. 1998).
V. Valloppillil and J. Cohen,"Hierarchical HTTP Routing Protocol," Internet Draft, http://www.nlanr.net/Cache/ICP/draft-vinod-icp-traffic-dist-00.txt (Apr. 21, 1997).
D. Karger, E. Lehman, T. Leighton, M. Levine, D. Lewin, and R. Panigrahy, "Consistent Hashing and Random Trees: Distributed Caching Protocols for Relieving Hot Spots on the World Wide Web," Proc. 29th ACM Symposium on Theory of Computing (STOC 97), El Paso, Texas, 1997.
D. Karger, Sherman, A. Berkheimer, B. Bogstad, R. Dhanidina, K. Iwamoto, B. Kim, L. Matkins, and Y. Yerushalmi, "Web Caching with Consistent Hashing," Proc. 8th International World Wide Web Conference, Toronto, Canada, May 1999.
L. Zhang, S. Michel, S. Floyd, V. Jacobson, K. Nguyen, and A. Rosenstein, "Adaptive Web Caching: Towards a New Global Caching Architecture," In Proceedings of the Third International Caching Workshop (Jun. 1998).
B.S. Michel, K. Nikoloudakls, P. Reiher, and L. Zhang, "URL Forwarding and Compression in Adaptive Web Caching," Proc. IEEE Infocom 2000, Tel Aviv, Israel, Apr. 2000.
R. Tewari, "Architectures and Algorithms for Scalable Wide-area Information Systems," Ph.D. Dissertation, Chapter 5, Computer Science Department, University of Texas at Austin, Aug. 1998.
R. Tewari, M. Dahlin, H.M. Vin, and J.S. Kay, "Design Considerations for Distributed Caching on the Internet," Proc. IEEE 19th international Conference on Distributed Computing Systems, May 1999.
Li Fan, Pei Cao, Jussara Almeida, and Andrei Z. Broder, "Summary cache: A scalable wide-area web cache sharing protocol," in Proceedings Sigcomm '98. ACM, Oct. 1998. http://www.cs.wisc.edu/cao/papers/ summarycache.html.
S. Gadde, M. Rabinovich, and J. Chase, "Reduce, reuse, recycle: An approach to building large Internet caches," in Proc. 6th Workshop Hot Topics in Operating Systems (HotOS-VI), Cape Cod, MA, May 1997, pp. 93-98.
Alex Rousskov and Duane Wessels, "Cache digests," Proceedings 3rd International WWW Caching Workshop, Manchester, England (Apr. 17, 1998).
Renu Tewari, Michael Dahlin, Herrick M. Vin, and Jonathan S. Kay, "Design considerations for distributed caching on the internet," Technical report, Department of Computer Sciences, University of Texas Austin, http://www.cs.utexas.edu/users /UTCS/techreports/ (Oct. 1998).
P. Rodriguez and E.W. Briesack, "Continuous Multicast Push of Web Documents over The Internet," IEEE Network Magazine, vol. 12, No. 2, pp. 18-31, 1998.
Z. Fei, S. Bhattacharjee, E.W. Zegura, and M.H. Ammar, "A Novel Server Selection Technique for Improving The Response Time of a Replicated Service," Proc. IEEE Infocom 98, Mar. 1998, pp. 783-791.
C. Parsa and J.J. Garcia-Luna-Aceves, "TCP-Santa Cruz: Improving TCP Performance over Networks with Heterogeneous Transmission Media", Proc. IEEE ICNP 99.
Craig Partridge, Trevor Mendez, and Walter Milliken, "Host Anycasting Service," Network Working Group, RFC 1546 (Nov. 1993).
"Cisco Distributed Director," http://www.tlc.iet.unipi.it/VoiceIP/cisco/114.pdf (Oct. 1998).
Robert R. Jueneman, "Novell Certificate Extension Attributes," Tutorial and Detailed Design Version 0.998 (Aug. 7, 1998).
G. Maclarty, et al., "Policy-based content delivery: an active network approach," Computer Communications 24 (2001), University of Technology, Sydney, Faculty of Information Technology, Australia, Elsevier Science B.V 2001 pp. 241-248 (2001).
http://www.cache.ja.net/workshop./papers.html, Oct. 3, 2001.
Tim Berners-Lee, et al., "HTDaemon: TCP/IP based server for Hypertext," source code as of Jul. 8, 1994.
PCT Written Opinion for PCT Counterpart Application No. PCT/US01/08701, 7 pgs. (Jul. 5, 2005).
PCT Notification of Transmittal of the International Search Report or the Declaration for PCT Counterpart Application No. PCT/US01/08701, 7 pgs. (Oct. 21, 2003).
C. Hedrick, "Routing Information Protocol," XP002233127, Network Working Group, Request for Comments: 1058 (Jun. 1998).
Samrat Bhatacharjee, et al., "Application-Layer Anycasting," XP010251961, INFOCOM '97. 16th Annual Joint Conference of the IEEE Computer and Communications Societies. Driving the Information Revolution, Proceedings IEEE Kobe, Japan, pp. 1388-1396 (Apr. 7, 1997).
J. Bound and P. Rogue, "IPv6 Anycasting Service: Minimum Requirements for end nodes," XP002192644, IETF Internet Draft, pp. 4-6, http://www.watersprings.org/pub/id/draft-bound-anycast-00.txt (Jun. 1996).

(56) References Cited

OTHER PUBLICATIONS

Lixia Zhang, Sally Floyd, Van Jacobsen, "Adaptive Web Caching," Proceedings of the 1997 NLANR Web Cache Workshop, pp. 1-9 (Apr. 25, 1997).
Pablo Rodriguez, Ernst W. Biersack, and Keith W. Ross, "Improving the WWW: Caching or Mulicast?," Institut EURECOM 2229, Route Computer Networks and ISDN Systems, pp. 1-17 (Mar. 30, 1998).
Masato Oguchi, et al., "A Proposal for a World-Wide Web Caching Proxy Mechanism," XP000754599, Global Information Infrastructure (GII) Evolution: Interworking Issues, Interworking '96, Third International Symposium of Interworking, Nara (Japan), Oct. 1-3, 1996, pp. 531-540 (Oct. 1, 1996).
Erol Basturk, et al, "Using Network Layer Anycast for Load Distribution in the Internet," IBM Research Report, Document No. RC20938, pp. 1 and 1-20 (Jul. 29, 1997).
Paul Mockapetris, "Domain System Changes and Observations," Network Working Group RFC 973 (Jan. 1986).
Robert L. Carter, et al., "On the network impact of dynamic server selection," Computer Networks 31, pp. 2529-2558 (1999).
W. Simpson, "IP in IP Tunneling," RFC 1853, Oct. 1995.
K. Obraczka, et al., "A Tool fof Massively Replicating Internet Archives: Design, Implementation, and Experience," Proceeding of the 16th International Conference on Distributed Computing Systems, Hong Kong, (May 27-30, 1996).
Chu et al., "A Case for End System Multicast," Proceedings of ACM SIGMETRICS, SAnta Clara, CA, pp. 1-12 (Jun. 2000).
John Jannotti, et al., "Overcast: Reliable Multicasting with an Overlay Network," Proceedings of OSDI, San Diego, CA (Oct. 2000).
Joe Touch, "Dynamic Internet Overlay Deployment and Management Using the X-Bone," Proceedings of IEEE ICNP, Osaka, Japan (2000).
J. Garcia-Luna-Aceves and M. Spohn, "Scalable Link-State Internet Routing," ICNP, Sixth International Conference on Network Protocols (ICNP '98), Austin, Texas, pp. 52-61 (Oct. 14-16, 1998).
P. Mockapetris, "Domain Names—Concepts and Facilities," RFC 1034 (Nov. 1987).
P. Mockapetris, "Domain Names—Implementation and Specification," RFC 1035 (Nov. 1987).
PCT Notification of Transmittal of the International Search Report or the Declaration for PCT Counterpart Application No. PCT/US02/28829, 5 pgs.(Jan. 28, 2003).
Stephen Kent and Randall Atkinson, "Security Architecture for the Internet Protocol," RFC 2401 (Nov. 1998).
Y. Rekhter and T. Li, "A Border Gateway Protocol 4 (BGP-4)," Network Working Group, Request for Comments: 1771, (Mar. 1995).
PCT Notification of Transmittal of the International Search Report or the Declaration for PCT Counterpart Application No. PCT/US02/28961, 4 pgs (Dec. 10, 2002).
PCT Notification of Transmittal of the International Search Report or the Declaration for PCT Counterpart Application No. PCT/US02/28960, 6 pgs (Jan. 28, 2003).
Bruce Schneier, "Applied Cryptography: Protocols, Algorithms, and Source Code in C," Second Edition, Table of Contents, pp. 30-31, 34-44, 466-474, 483-502, and 10 page errata sheet (1996).
Bradley R. Smith, et al. "Federated Networks Bootstrap Services," University of California Computer Engineering, Santa Cruz, CA 95064, 2 pages (Nov. 8, 1998).
Brian Neil Levine, et al. "New Routing Services for Internet Multicast," University of California Computer Engineering Department, School of Engineering, Santa Cruz, CA 95064 USA, 17 pages (Apr. 30, 1998).
J.J. Garcia-Luna-Aceves and Ewerton L. Madruga, "The Core-Assisted Mesh Protocol," IEEE Journal on Selected Areas in Communications, vol. 17, No. 8, pp. 1380-1394 (Aug. 1999).
Brian Neil Levine and J.J. Garcia-Luna-Aceves, "Improving Internet Multicast with Routing Labels," 10 pages (1997).
Sandra G. Dykes, et al., "An Empirical Evaluation of Client-side Server Selection Algorithms," IEEE Infocom, vol. 3, pp. 1361-1370 (Mar. 2000).
John Postel, "Transmission Control Protocol", RFC 793, Darpa Intenet Program Protocol Specification, 90 pgs., (Sep. 1981).
PCT Notification of Transmittal of the International Preliminary Examination Report for PCT Counterpart Application No. PCT/US01/08701, 8 pgs., (Apr. 27, 2006).
EP Communication enclosing Supplementary European Search Report for Counterpart European Application No. 02763625.7, 3 pgs., (Dec. 22, 2010).
EP Communication enclosing Supplementary European Search Report for Counterpart European Application No. 02798206.5, 3 pgs., (Dec. 21, 2010).
Office Action for Counterpart European Application No. 01926390.4, 4 pgs., (May 4, 2005).
EP Communication enclosing Supplementary European Search Report for Counterpart European Application No. 02766274.1, 3 pgs., (Dec. 21, 2010).
Chawathe, Y., et al., "An Architecture for Internet Content Distribution as an Infrastructure Service" downloaded from the Internet on May 11, 2011, pp. 1-14.
A. Heddaya and S. Mirdad, "WebWave: Globally Load Balance Fully Distributed Caching of Hot Published Documents," Technical Report BU-CS-96-024, Boston University, Computer Science Department, Oct. 1996.
3W3 Cache Workshops, "Submitted Papers," retrieved from the Internet on Oct. 2, 2001 from http://www.cache.ja.net/events/workshops/papers.html, 3rd International WWW Caching Workshop (Jun. 15-17, 1998), 6 pgs.

* cited by examiner

SYSTEM AND METHOD FOR DIRECTING CLIENTS TO OPTIMAL SERVERS IN COMPUTER NETWORKS

RELATED APPLICATIONS

The present application is a divisional of U.S. patent application Ser. No. 12/645,443, filed Dec. 22, 2009, which is a divisional of U.S. patent application Ser. No. 10/241,321, filed Sep. 10, 2002, now issued U.S. Pat. No. 7,664,876, which claims the priority benefit of the following commonly-owned and U.S. Provisional patent applications:

Application No. 60/323,126, entitled "SYSTEM AND METHOD FOR DIRECTING CLIENTS TO OPTIMAL SERVERS IN COMPUTER NETWORKS" filed Sep. 10, 2001, by J. J. Garcia-Luna-Aceves and Srinivas Vutukurvy; and Application No. 60/322,899, entitled "SYSTEM AND METHOD FOR INFORMATION OBJECT ROUTING IN COMPUTER NETWORKS", filed Sep. 10, 2001, by Jyoti Raju, J. J. Garcia-Luna-Aceves and Bradley R. Smith; and which is also a continuation in part of commonly owned U.S. patent application Ser. No. 09/810,148, entitled "SYSTEM AND METHOD FOR DISCOVERING INFORMATION OBJECTS AND INFORMATION OBJECT REPOSITORIES IN COMPUTER NETWORKS", filed Mar. 15, 2001, by J. J. Garcia Luna-Aceves, which issued as U.S. Pat. No. 7,162,539 and which claims priority from U.S. Provisional Patent Application No. 60/190,331, filed Mar. 16, 2000 and from U.S. Provisional Patent Application No. 60/200,401, filed Apr. 28, 2000, and which issued as U.S. Pat. No. 7,162,539 B2 on Jan. 9, 2007.

FIELD OF THE INVENTION

The present invention relates to a system and method for directing a client (i.e., an information requesting application such as a Web browser) to an optimal server (i.e., information object repository) among many available servers for servicing of a request for one or more information objects.

BACKGROUND

An internetwork is a collection of computer networks interconnected by nodes, each such node may be a general-purpose computer or a specialized device, such as a router. As such, an internetwork is often called a network of networks. The purpose of building an internetwork is to provide information services to end nodes, each end node may be a general-purpose computer or a specialized device, such as a camera or a display. The Internet is an internetwork in which information is organized into packets to be distributed on a store- and forward manner from source to destination end nodes, and in which routers and end nodes use the Internet Protocol (IP) to communicate such packets.

The World Wide Web (also known as WWW or Web) has become an essential information service in the Internet. The Web constitutes a system for accessing linked information objects stored in end nodes (host computers) all over the Internet. Berners-Lee wrote the original proposal for a Web of linked information objects (T. Berners-Lee, "Information Management: A Proposal," CERN Document, March 1989). The Web consists of a vast collection of information objects organized as pages, and each page may contain links to other pages or, more generally, information objects with which content is rendered as audio, video, images, text or data. Pages are viewed by an end user with a program called a browser (e.g., Netscape Navigator™). The Web browser runs in an end system at the user premises. The client (Web browser) obtains the required information objects from a server (Web server) using a request-response dialogue as part of the Hypertext Transfer Protocol (HTTP). Information objects are identified by means of names that are unique throughout the Internet; these names are called Uniform Resource Locators or URLs. A URL consists of three components:

(1) the protocol or scheme to be used for accessing the object (e.g., http);

(2) the name (a DNS name) of the host on which the object is located; and (3) a local identifier that is unique in the specified host.

Like any large-scale system, the Web requires the use of mechanisms for scaling and reliability. More specifically, as the number of information objects that can be obtained through the Web increases, people find it more difficult to locate the specific information objects they need. Furthermore, as the number of Web users and servers increase, the sites or servers that store the requested information objects may be very far from the users requesting the objects, which leads to long latencies in the access and delivery of information, or the servers storing the information objects may be overwhelmed with the number of requests for popular information objects.

To enable the Web to scale to support large and rapidly increasing numbers of users and a vast and growing collection of information objects, the information objects in the Web must be stored distributedly at multiple servers, in a way that users can retrieve the information objects they need quickly and without overwhelming any one of the servers storing the objects. Accordingly, distributing information objects among multiple sites is necessary for the Web to scale and be reliable. The schemes used to accomplish this are called Web caching schemes. In a Web caching scheme, one or multiple Web caches or proxy Web servers are used in computer networks and the Internet to permit multiple host computers (clients) to access a set of information objects from sites other than the sites from which the content (objects) are provided originally. Web caching schemes support discovering the sites where information objects are stored, distributing information objects among the Web caches, and retrieving information objects from a given Web cache. The many proposals and implementations to date differ on the specific mechanisms used to support each of these services.

Many methods exist in the prior art for determining the server, cache, mirror server, or proxy from which information objects should be retrieved. The prior art dates to the development of the ARPANET in the 1970s and the study and implementation of methods to solve the file allocation problem (FAP) for databases distributed over the ARPANET and computer networks in general.

File allocation methods for distributed databases (e.g., W. W. Chu, "Optimal File Allocation in a Multiple Computer System," IEEE Transactions on Computers, October 1969: S. Mahmoud and J. S. Riordon, "Optimal Allocation of Resources in Distributed Information Networks," ACM Transactions on Data Base Systems, Vol. 1, No. 1, March 1976; H. L. Morgan and K. D. Levin, "Optimal Program and Data Locations in Computer Networks," Communications of the ACM, Vol. 20, No. 5, May 1977) and directory systems (e.g., W. W. Chu, "Performance of File Directory Systems for Data Bases in Star and Distributed Networks," Proc. National Computer Conference, 1976, pp. 577-587; D.

Small and W. W. Chu, "A Distributed Data Base Architecture for Data Processing in a Dynamic Environment," Proc. COMPCON 79 Spring) constitute some of the earliest embodiments of methods used to select a delivery site for accessing a file or information object that can be replicated at a number of sites.

Another example of this prior art is the method described by Chiu, Raghavendra and Ng (G. Chiu, C. S. Rahgavendra, and S. M. Ng, "Resource Allocation with Load Balancing Consideration in Distributed Computing Systems," Proc. IEEE INFOCOM 89, Ottawa, Ontario, Canada, April 1989, pp. 758-765). According to this method, several identical copies of the same resource (e.g., a file, an information object) are allocated over a number of processing sites (e.g., a mirror server, a cache) of a distributed computing system. The method attempts to minimize the cost incurred in replicating the resource at the processing sites and retrieving the resource by users of the system from the processing sites.

Several different approaches exist in the prior art for discovering information objects in Web caching schemes. Recent work has addressed the same resource allocation and discovery problems within the context of Internet services. Guyton and Schwartz (J. D. Guyton and M. F. Schwartz, "Locating Nearby Copies of Replicated Internet Servers," Technical Report CU-CS-762-95, Department of Computer Science, University of Colorado-Boulder, February 1995; Proc. ACM SIGCOMM 95 Conference, Cambridge, Mass., August 1995, pp. 288-298) describe and analyze server location techniques for replicated Internet services, such as Network Time Protocol (NTP) servers and Web caches.

Guyton and Schwartz propose gathering location data with router support in two ways. In one method, routers advertise the existence or absence of replicated servers as part of their normal routing exchanges involving network topological information. Routers examine a distance metric for the advertised servers in a way that each router retains knowledge of at least the nearest servers. In this way, each router in an internetwork has enough knowledge to direct client requests to the nearest servers, without necessarily having to maintain knowledge of all the servers in the internetwork. In another method, servers poll routers for the content of their routing tables.

Guyton and Schwartz also describe a method for gathering location data using router probes without router support by means of measurement servers. According to this method, measurement servers explore the routes to the replicated serves providing services and content to the clients. When a client asks a measurement server for a list of nearby servers from which to request a service, the measurement server takes into account the route back to the client in deciding upon the list of servers that appear closer to the client.

One approach to object discovery consists in organizing Web caches hierarchically. In a hierarchical Web cache architecture, a parent-child relationship is established among caches; each cache in the hierarchy is shared by a group of clients or a set of children caches. A request for an information object from a client is processed at a lowest-level cache, which either has a copy of the requested object, or asks each of its siblings in the hierarchy for the object and forwards the request to its parent cache if no sibling has a copy of the object. The process continues up the hierarchy, until a copy of the object is located at a cache or the root of the hierarchy is reached, which consists of the servers with the original copy of the object.

One of the earliest examples of hierarchical Web caching was the Discover system (A. Duda and M. A. Sheldon, "Content Routing in Networks of WAIS Servers." Proc. IEEE 14th International Conference on Distributed Computing Systems, June 1994; M. A. Sheldon, A. Duda, R. Weiss, J. W. O'Toole, Jr., and D. K. Gifford, "A Content Routing System for Distributed Information Servers," Proc. Fourth International Conference on Extending Database Technology, March 1994), which provides associative access to servers; the user guides the refinement of requests.

Harvest (A. Chankhunthod, P. Danzing, C. Neerdaels, M. Schwartz, and K. Worrell, "A Hierarchical Internet Object Cache," Proc. USENIX Technical Conference 96, San Diego, Calif., January 1996) and Squid (D. Wessels, "Squid Internet Object Cache," http://www.squid.org, August 1998) are two of the best known hierarchical Web cache architectures. Harvest and Squid configure Web caches into a static hierarchical structure in which a Web cache has a static set of siblings and a parent. The Internet Caching Protocol or ICP (D. Wessels and K. Claffy, "Internet Cache Protocol (ICP), Version 2," RFC 2186, September 1997) is used among Web caches to request information objects.

In the Harvest hierarchies, siblings and parents are configured manually in Web caches or proxies; this is very limiting and error prone, because reconfiguration must occur when a cache enters or leaves the system. A more general limitation of hierarchical Web caching based on static hierarchies is that the delays incurred in routing requests for information objects can become excessive in a large-scale system, and the latency of retrieving the information object from the cache with a copy of the object can be long, because there is no correlation between the routing of the request to a given cache in the hierarchy and the network delay from that cache to the requesting client. Furthermore, some Web caches may be overloaded with requests while others may be underutilized, even if they store the same objects.

In the WebWave protocol (A. Heddava and S. Mirdad. "WebWave: Globally Load Balanced Fully Distributed Caching of Hot Published Documents," Technical Report BU-CS-96-024, Boston University, Computer Science Department, October 1996; A. Heddaya and S. Mirdad, "WebWave: Globally Load Balanced Fully Distributed Caching of Hot Published Documents," Proc. IEEE 17th International Conference on Distributed Computing Systems, Baltimore, Md., May 1997) Web caches are organized as a tree rooted at the server that provides the original copy of one object or a family of information objects; the leaves of the tree are the clients requesting the information objects, and the rest of the nodes in the tree are Web caches. The objective of the protocol is to achieve load balancing among Web caches; each Web cache in such a tree maintains a measurement of the load at its parent and children in the tree, and services or forwards the request to its parent automatically based on the load information. This approach reduces the possibility of overloading Web caches as in the Harvest approach to hierarchical Web caching: however, delays are still incurred in the propagation of requests from heavily loaded Web caches to their ancestors in the Web hierarchy.

Hash routing protocols (K. W. Ross, "Hash Routing for Collections of Shared Web Caches," IEEE Network, Vol. 11, No. 6, November 1997, pp 37-44) constitute another approach to support object discovery in shared caches. Hash routing protocols are based on a deterministic hashing approach for mapping an information object to a unique cache (D. G. Thaler and C. V. Ravishankar, "Using Name-Based Mappings To Increase Hit," IEEE/ACM Trans. Networking, 1998; V. Valloppillil and J. Cohen, "Hierarchical HTTP Routing Protocol," Internet Draft, http://www.nlanr.net/Cache/ICP/draft-vinod-icp-traffic-dist-00.txt) to distribute the information objects (universal resource locator or URL in the case of the Web) among a number of caches; the end result is the creation of a single logical cache distributed over many physical caches. An important characteristics of this scheme is that information objects are not replicated among the cache sites. The hash function can be stored at the clients or the cache sites. The hash space is partitioned among the N cache sites. when a client requires access to an information object o, the value of the hash function for o, h(o), is calculated at the client or at a cache site (in the latter case the cache would be configured at the client, for example). The value of h(o) is the address of the cache site to contact in order to access the information object o.

The Cache Resolver is another recent approach to hierarchical Web caching (D. Karger, E. Lehman, T, Leighton, M. Levine, D. Lewin, and R. Panigrahy, "Consistent Hashing and Random Trees: Distributed Caching Protocols for Relieving Hot Spots on the World Wide Web," Proc. 29th ACM Symposium on Theory of Computing (STOC 97), El Paso, Tex., 1997; D. Karger, Sherman, A. Berkheimer, B. Bogstad, R. Dhanidina, K. Iwamoto, B. Kim, L. Matkins, and Y. Yerushalmi, "Web Caching with Consistent Hashing," Proc. 8th International World Wide Web Conference, Toronto, Canada, May 1999). This approach combines hierarchical Web caching with hashing and consists of two main tools, random cache trees and consistent hashing. A tree of Web caches is defined for each information object. When a browser (client) requires an information object, it picks a leaf of the tree and submits a request containing its identifier, the identifier of the object, the sequence of caches through which the request is to be routed if needed. A Web cache receiving a request determines if it has a local copy of the page and responds to the request if it does; otherwise, it forwards the request to the next Web cache in the path included in the request.

A Web cache starts maintaining a local copy of an information object when the number of requests it receives for the object reaches a predefined number. A client selects a Web cache by means of consistent hashing, which disseminates requests to leaves of the Web caching hierarchy evenly but, unlike traditional hashing techniques, need not redistribute an updated hash table every time a change occurs in the caching hierarchy (e.g., a new Web cache joins or a Web cache fails). Because caching is difficult to implement or add to existing Web browsers, the Cache Resolver approach implements the hashing in DNS servers modified to fit this purpose.

The remaining limitations with this approach stem from the continuing use of a hierarchy of Web caches and the need to implement a hashing function in either Web clients or DNS servers. Routing a request through multiple Web caches can incur substantial delays for clients to retrieve information objects that are not popular among other clients assigned to the same Web cache by the hashing function. Additional delays, even if small, are incurred at the DNS server that has to provide the address of the Web cache that the client should access. Furthermore, the DNS servers supporting the consistent hashing function must receive information about the loading of all the Web caches in the entire system, or at least a region of the system, in order to make accurate load-balancing decisions.

This DNS-based approach, without the use of hierarchies of Web caches, is advocated in the Akamai CDN solution (F. T. Leighton and D. M. Lewin, "Global Hosting System," U.S. Pat. No. 6,108,703. Aug. 22, 2000). The "global hosting system" advocated by Akamai assumes that a content provider services an HTML document in which special URLs specifying a domain name specific to Akamai. When the client needs to obtain the IP address of the Web cache hosting the content specified in the special URL, the client first contacts its local DNS. The local DNS is pointed to a "top-level" DNS server that points the local DNS to a regional DNS server that appears close to the local DNS. The regional DNS server uses a hashing function to resolve the domain name in the special URL into the address of a Web cache (hosting server) in its region, which is referred to as the target Web cache in the present application, in a way that the load among Web caches in the region is balanced. The local DNS passes the address of that Web cache to the client, which in turn sends its request for the information object to that Web cache. If the object resides in the target Web cache, the cache sends the object to the client; otherwise, the object is retrieved from the original content site.

The global hosting system advocated by Akamai was intended to address problems associated with traditional load-balanced mirroring solutions in which a load balancer or a hierarchy of load balancers redirect requests to one of a few hosting sites to balance the load among such sites. Companies such as Cisco Systems of Santa Clara, Calif., F5 Networks, Inc. of Seattle, Wash., Resonate, Inc. of Sunnyvale, Calif. Nortel Networks of Brampton, Ontario, and Foundry Networks, Inc. of San Jose, Calif. currently provide examples of load-balanced solutions. The limitations of the global hosting system are inherent to the fact that the approach is, in essence, a DNS-based load-balanced mirroring solution. The global hosting system selects a target Web cache based entirely on the region that appears to favor the local DNS, which need not favor the client itself, and balances the load among Web caches without taking into account the latency between the Web caches and the clients. In the case of a cache miss, the information object has to be retrieved from the original content site, which means that latencies in the delivery of content can vary widely, unless the content is mirrored in all the caches of all regions.

Another alternative approach to hierarchical web caching and hash routing protocols consists of forwarding client requests for URLs using routing tables that are very similar to the routing tables used today for the routing of IP packets in the Internet (L. Zhang, S. Michel, S. Floyd, and V. Jacobson, "Adaptive Web Caching: Towards a New Global Caching Architecture," Proc. Third International WWW Caching Workshop, Manchester, England, June 1998, B. S. Michel, K. Nikoloudakis, P. Reiher, and L. Zhang, "URL Forwarding and Compression in Adaptive Web Caching," Proc. IEEE Infocom 2000, Tel Aviv, Israel, April 2000). According to this approach, which is referred to as "UPI request forwarding" herein, Web caches maintain a "URL request routing table" and use it to decide how to forward URL requests to another Web caches when requested information objects are not found locally. The keys of the URL request routing tables are URL prefixes, which are associated with one or more identifiers to the next-hop Web caches or cache groups, and a metric reflecting the average delay to retrieve a request from a matching URL.

In this approach, an entry in the URL request routing table specifies a URL prefix and the next-hop Web cache towards an area or neighborhood of Web caches where the object resides. Ideally, a Web cache needs to know where a copy of a given object resides; however, because of the large number of objects (identified by URLs) that can be requested in a system, the URL request forwarding approach requires Web caches to be organized into areas or neighborhoods. All Web caches within the same area know the objects available in every other Web cache in the same area. In addition, for those objects that are not found in the area of a Web cache, the Web cache also maintains the next-hop Web cache towards the area in which a Web cache with the content resides.

Unfortunately, this approach has several scaling and performance limitations. First, requiring each Web cache to know all the Web caches where each object in the area resides incurs a large overhead, which is akin to the overhead of a traditional topology-broadcast protocol for IP routing, with the added disadvantage that the number of objects that can reside in an area can be much larger than the number of IP address ranges maintained in backbone routers of the Internet. Second, because Web caches only know about the next hop towards a URL that does not reside in a region, a request for an object that lies outside the area of a Web cache may traverse multiple Web-cache hops before reaching a Web cache in the area where an object is stored. This introduces additional latencies akin to those incurred in the caching hierarchies proposed in other schemes discussed above. Third, it is difficult to modify Web caches in practice to implement the mechanisms needed for the forwarding of URL requests.

To reduce the delays incurred in hierarchical Web caches, Tewari, Dahlin, Vin and Kay (R. Tewari, "Architectures and Algorithms for Scalable Wide-area Information Systems," Ph.D. Dissertation, Chapter 5, Computer Science Department, University of Texas at Austin, August 1998; R. Tewari, M. Dahlin, H. M. Vin, and J. S. Kay, "Design Considerations for Distributed Caching on the Internet," Proc. IEEE 19th International Conference on Distributed Computing Systems, May 1999) introduce hint caches within the context of a hierarchical Web caching architecture. According to this scheme, a Web cache maintains or has access to a local hint cache that maintains a mapping of an object to the identifier of another Web cache that has a copy of the object and is closest to the local hint cache. Web caches at the first level of the hierarchy maintain copies of information objects, while Web caches at higher levels only maintain hints to the objects. Hints are propagated along the hierarchy topology from the Web caches lower in the hierarchy to Web caches higher in the hierarchy. Furthermore, a Web cache with a copy of an object does not propagate a hint for the object. The limitation with this approach is that a Web caching hierarchy must still be established, which needs to be done manually in the absence of an automated method to establish the hierarchy, and the Web caching hierarchy must match the locality of reference by clients to reduce control overhead.

A number of proposals exist to expedite the dissemination of information objects using what is called "push distribution" and exemplified by Backweb, Marimba and Pointcast ("BackWeb: http://www.backweb.com/'"; '"Marimba: http://www.marimba.com'"; "Pointcast: http://www.pointcast.com'"). According to this approach, a Web server pushes the most recent version of a document or information object to a group of subscribers. The popular Internet browsers, Netscape Navigator and Internet Explorer™, use a unicast approach in which the client receives the requested object directly from the originating source or a cache. As the number of subscribers of a document or information object increases, the unicast approach becomes inefficient because of processing overhead at servers and proxies and traffic overhead in the network. The obvious approach to make push distribution scale with the number of subscribers consists of using multicast technology. According to this approach (P. Rodriguez and E. W. Biersack, "Continuous Multicast Push of Web Documents over The Internet," IEEE Network Magazine, Vol. 12, No. 2, pp. 18-31, 1998), a document is multicasted continuously and reliably within a multicast group. A multicast group is defined for a given Web document and subscribers join the multicast group of the Web document they need to start receiving the updates to the document. A multicast group consists of the set of group members that should receive information sent to the group by one or multiple sources of the multicast group. The main shortcoming of this particular approach to push distribution are:

The portion of the Internet where subscribers are located must support multicast routing distribution.
A multicast address and group must be used for each Web document that is to be pushed to subscribers, which becomes difficult to manage as the number of documents to be pushed increases.

Furthermore, Rodriguez, Biersack, and Ross (P. Rodriguez, E. W. Biersack, and K. W. Ross, "Improving the WWW: Caching or Multicast?," Institut EURECOM 2229. Route Computer Networks and ISDN Systems, pp. 1-17 (Mar. 30, 1998) have shown that multicasting Web documents is an attractive alternative to hierarchical Web caching only when the documents to be pushed are very popular, caching distribution incurs less latency.

Kenner and Karush (B. Kenner and A. Karush, "System and Method for Optimized Storage and retrieval of Data on a Distributed Computer Network," U.S. Pat. No. 6,003,030. Dec. 14, 1999) propose a method for expediting the delivery of information objects to end users. In this method, the end user site is equipped with special software in addition to the Web browser. This software consists of a configuration utility and a client program. The configuration utility is used to download a delivery site file specifying a list of the delivery sites (Web caches or originating Web servers) from which the information objects can be retrieved and a suite of tests that can be run to determine which delivery site to contact. The limitations with this approach stem from the fact that it is not transparent to end user sites. In particular, the end user site needs to run additional software; performance tests must be conducted from the end-user site to one or more delivery sites to decide which site to use; and when changes occur to the delivery sites, a new version of the delivery site file must be retrieved by the end-user site, or new performance tests must be conducted.

Another approach to helping select servers in a computer network (Z. Fei, S. Bhattacharjee, E. W. Zegura, and M. H. Ammar, "A Novel Server Selection Technique for Improving The Response Time of a Replicated Service" Proc. IEEE Infocom 98, March 1998, pp. 783-791) consists of broadcasting server loading information after a certain load threshold or time period is exceeded. The limitation of this approach is that, just as with topology-broadcast protocols used for routing in computer networks, the scheme incurs substantial overhead as the number of servers increases.

Still another approach to directing clients to hosting sites with requested information objects or services is the replica routing approach proposed by Sightpath. Inc. (D. K. Gifford, "Replica Routing," U.S. Pat. No. 6,052,718, Apr. 18, 2000). According to the Replica Routing approach, an information object or service is replicated in a number of replica servers. The replica routing system redirects a client requesting the information object or service to a "nearby" replica of the object or service. In one approach, all replica routers know the replica advertisements from each of the replica servers in the system, which summarize information about their location and observations about the local internetwork topology and performance. Using this flooding of advertisements, a replica router discerns which replica server appears nearby any one client. However, requiring each replica router to receive the advertisements from every other replica server becomes impractical as the number of replica servers and replica routers increases.

To remedy this problem, replica routers are organized into a hierarchy, and replica advertisements are propagated only part way up such router hierarchy. A client request is routed to the root of the hierarchy and from there is forwarded down the hierarchy, until it reaches a replica router with enough knowledge about the replica's internetwork location to make an informed redirection decision. This approach has similar performance and scaling limitations as the prior approaches summarized above based on hierarchies of Web caches, flooding of information among caches or servers, and forwarding of requests over multiple hops.

Another recent approach to directing clients to hosting sites with requested information objects or services is the enhanced network services method by Phillips, Li, and Katz (S. G. Phillips, A. J. Li, and D. M. Katz, "Enhanced Network Services Using a Subnetwork of Communicating Processors," U.S. Pat. No. 6,182,224, Jan. 30, 2001.). Insofar as directing clients to servers, the enhanced network services method is very similar to the gathering of location data with router support advocated by Guyton and Schwartz described previously. This technique is used by Cisco Systems of Santa Clara, Calif.

As in the Guyton and Schwartz approach, routers using the enhanced network services approach gather network topological data and also include as part of their normal routing exchanges information about the hosts that can provide content and services to clients; routers can then rank the hosts according to their relative distance in the network. In addition to data regarding hosts that can provide services, routers in the enhanced network services approach can include in their normal routing exchanges host information regarding logged-in users and willingness to pay for performing a designated service. This approach has a number of performance and scaling limitations just like other prior approaches summarized above. These limitations include the following.

The client in Cisco's enhanced network services method is pre-configured to contact a specific name server or router. In the case of a name server, the name server contacts the router on behalf of the client. In either case, the router determines the best server from the given list of server addresses. The router uses its routing tables (and server loads when available) to locate the best server. The assumption is that the proxy name server or router is close to the client in network terms. This assumption and preconfiguration are too restrictive. A more general solution is needed to enable an entity capable to provide enhanced network services to be contacted by any client to obtain best server information.

In contrast to the proposal by Guyton and Schwartz, the enhanced network services approach does not attempt to limit the amount of network topological information that routers need to exchange in order to direct clients to best qualified servers. Hence, the use of flooding of information among nodes providing enhanced network services and the forwarding of requests over multiple hops limits the scalability of the Cisco approach.

In Cisco's enhanced network services method, the client obtains the list of server addresses and provides it to the router for ordering them based on distances. The network latencies from the client to the servers are obtained from "traditional" routing tables. The server load information is then taken into account on demand at the router that receives the request. This imposes unnecessary functionality in the clients, because nodes in charge of enhanced services (not necessarily IP routers) could and should be more proactive in determining the best matches for clients in a completely transparent way from a client's standpoint. Furthermore, in Cisco's enhanced network services method, a router has route information only for itself to the servers. This is only partial information and, hence, the router is unable to determine distance from arbitrary clients to servers. The routers do not have the capability to combine network topology views from different routers. Constructing Internet topologies using inter-domain routing information (e.g., as provide from the BGP) is not performed by the routers involved in this process.

SUMMARY OF THE INVENTION

In one embodiment, one or more tables are constructed at one or more of a collection of Web routers communicatively coupled to one another via a computer network that supports an inter-Web router communication protocol wherein inter-Web router communication messages are exchanged between neighbor Web routers. These one or more tables contain client-to-server distance information, and the tables that are constructed by each of the respective Web routers are stored in a computer-readable medium accessible by the corresponding Web router. As used in this context, the term client refers to any information object requesting device, or a group thereof, communicatively coupled to one or more of the Web routers and the term server refers the any information object repository accessible by one or more clients. Thereafter, using the client-to-server distance information contained in one or more of the tables, a determination of a best server for servicing a request for a particular information object made by one of the clients is made.

The best server may be determined in terms of distance from the best server to the client making the request and a current load on the best server. The distance from the best server to the client making the request may be measured in terms of network latency.

The tables may be updated in response to revised client-to-Web router distance information. Such revised client-to-Web router distance information may be included in the inter-Web router communication messages and is preferably determined, at least in part, from internetwork connectivity information received through an exchange of messages according to an inter-domain routing protocol (e.g., the Border Gateway Protocol). Furthermore, the tables may be updated in response to revised server load information and the updated table information transmitted to one or more of the Web routers using one or more inter-Web router communication messages.

A further embodiment provides a communication protocol that includes one or more messages passed between Web routers over a reliable transmission protocol used for inter-Web router communication. These messages include information which allows the Web routers to dynamically update mappings of client addresses or address ranges to information object repository addresses based on client-to-server distance and server load. The mappings are preferably optimal mappings of the client addresses or address ranges to the information object repository addresses and the messages report updated distances from these information object repository addresses to the client addresses or address ranges. For example, the messages may report, for each updated distance, an associated client address or address range and/or an associated anchor address of a Web router co-located with an information object repository that is the subject of the message.

Another embodiment provides a process wherein at a first Web router of a network of Web routers, a network latency map for at least one of the Web routers of the network and a client communicatively coupled to the at least one Web router is created using internetwork connectivity information received at the first Web router through an inter-domain routing protocol, and the network latency map is disseminated from the first Web router to one or more neighbor Web routers of the first Web router through a reliable communication protocol used for inter-Web router communication messages exchanged via the network. The network latency map specifies a distance between the client and the at least one Web router as reported by the first Web router.

Further, the network latency map may be used to produce a client-to-server map that specifies a most favored server for servicing information object requests by the client. The client-to-server map is produced by combining (e.g., adding together where the server load and the distance between the client and the at least one Web router are measured in common units) server load information with information specified by the network latency map.

The client-to-server map may be updated in response to one or more of a server load change or a network latency map update. Thereafter, the network latency map update may be transmitted as one of the inter-Web router communication messages exchanged via the network. Likewise, in response to updating the client-to-server map, a client-to-server map update may be transmitted as one of the inter-Web router communication messages exchanged via the network.

However, in one embodiment, the client-to-server map in response to a network latency map update only if the network latency map update specifies a better mapping than the client to server map. This condition is true if (1) a first sequence number associated with the network latency map update is greater than a second sequence number associated with the client-to-server map, (2) a first distance associated with the network latency map update is less than a second distance associated with the client-to-server map, or (3) a first result of a hashing function computed using one or more parameters of the network latency map update is less than a second result of the hashing function computed using corresponding one or more parameters of the client-to-server map.

A further embodiment provides a method in which an inter-Web router communication message including an update for a mapping between a client and a second Web router is received at a first Web router, and a client-to-Web router table at the first Web router is updated to include the mapping between the client and the second Web router if this client-to-Web router mapping specifies a better client-to-Web router distance than is currently maintained in the client-to-Web router table for the client. Thereafter, the mapping between the client and the second Web router may be propagated to neighbor Web routers of the first Web router. In addition, the mapping between the client and the second Web router may be used to compute a client-to-server mapping.

In such cases, a client-to-server table may be updated to include the client-to-server mapping if the client-to-server mapping specifies a better client-to-server distance than is currently maintained in the client-to-server table for the client. The client-to-server mapping is computed by adding server load to distance information included in the client-to-Web router mapping. Determining whether the client-to-Web router mapping specifies a better client-to-Web router distance than is currently maintained in the client-to-Web router table for the client may be done by comparing one or more of (1) sequence numbers associated with the client-to-Web router mapping and the client-to-Web router distance maintained in the client-to-Web router table, (2) anchor addresses associated with the client-to-Web router mapping and the client-to-Web router distance maintained in the client-to-Web router table, (3) Web router addresses associated with the client-to-Web router mapping and the client-to-Web router distance maintained in the client-to-Web router table, or (4) distances associated with the client-to-Web router mapping and the client-to-Web router distance maintained in the client-to-Web router table. The client-to-server mapping may also be propagated to neighbor Web routers of the first Web router.

BRIEF DESCRIPTION OF THE DRAWINGS

The present invention is illustrated by way of example, and not limitation, in the figures of the accompanying drawings in which like reference numerals refer to similar elements and in which.

DETAILED DESCRIPTION

Figure 1:
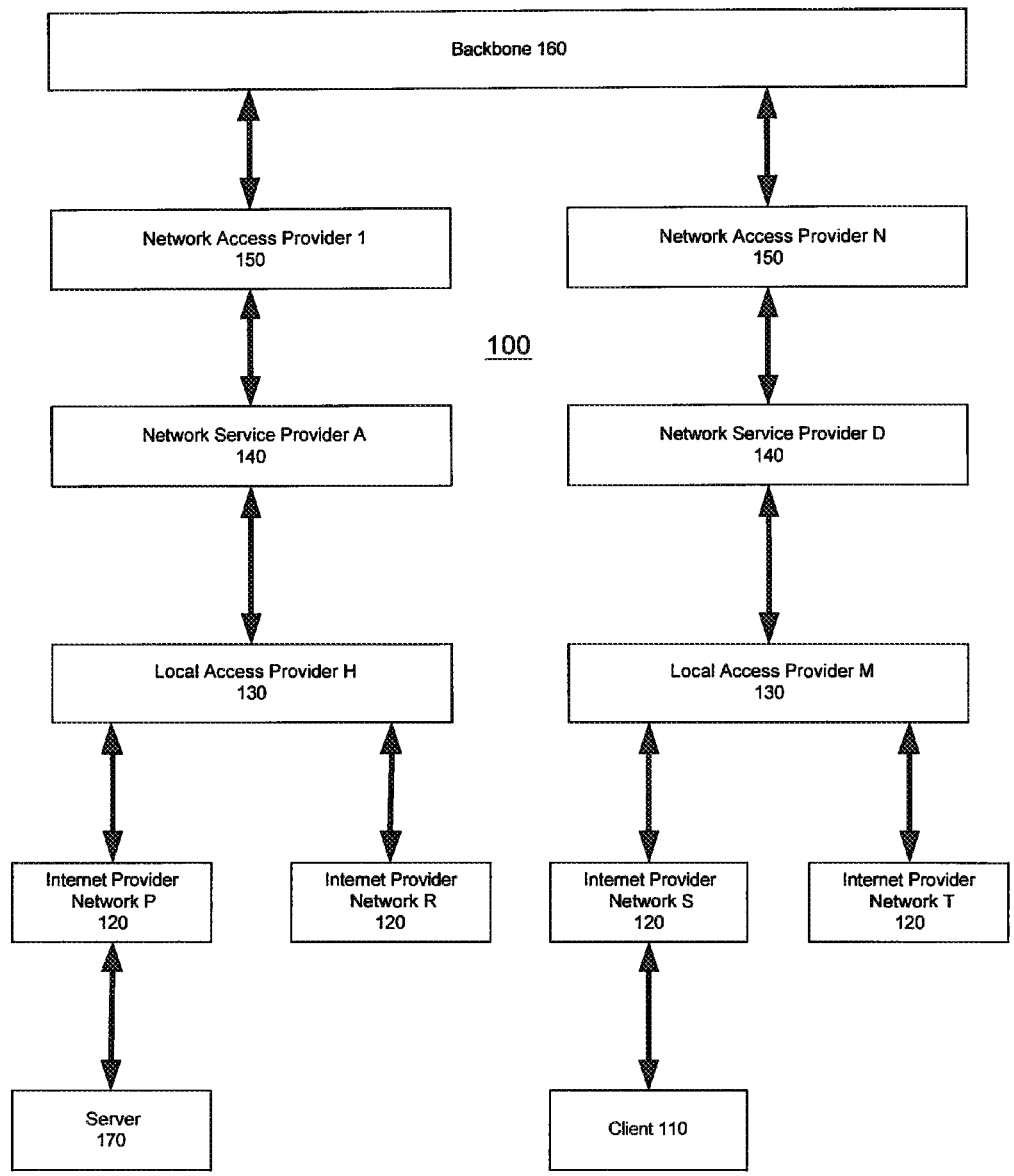
FIG. 1 illustrates a conventional internetwork, such as the Internet.

The core of the internet is congested and, hence, delivering content across the Internet incurs high latency. Increasing the bandwidth of the "last mile" (e.g., the last link in communication path to the end user or content source) via high-speed modems and digital subscriber line (DSL) technology, for example, alone will not improve the end-user experience of the Internet. What is required is a reduction in the end-to-end latencies of the Internet by avoiding congestion points in the core of the Internet.

To avoid Internet congestion and reduce latencies, content (e.g., web pages and related information objects) must be moved to the edge, i.e., to locations that are close to the clients. This requires maintaining copies of content on several caches located around the Internet, and then directing clients to their nearest cache. The present invention enables this functionality.

The present invention provides a method and system for directing a client (e.g., a Web browser) to an optimal server (e.g., a cache) among many available servers. An optimal server, from a client's viewpoint, is a server that offers the lowest response time in delivering a requested information object to the client. When the server does not hold the requested information object, it obtains that information object from another server that has the information object. In the case that none of the servers in the system have the requested information object, the server approaches the main or origin content server to obtain the information object. Thus, a method and system for directing clients to optimal caches and/or servers storing information objects distributed over computer networks will now be described.

In the following description, numerous specific details are set forth in order to provide a thorough understanding of the present invention. However, it will be evident to those of ordinary skill in the art that some of these specific details need not be used to practice the present invention and/or that equivalents thereof may be used. In other cases, well-known structures and components have not been shown in detail to avoid unnecessarily obscuring the present invention. Thus, although discussed with reference to certain illustrated embodiments, upon review of this specification, those of ordinary skill in the art will recognize that the present system and methods may find application in a variety of systems and the illustrated embodiments should be regarded as exemplary only and should not be deemed to be limiting in scope.

Some portions of the description that follow are presented in terms of algorithms and symbolic representations of operations on data within a computer memory (e.g., in pseudocode). These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In one embodiment of the present invention, a device called a Web router, which may be implemented in software and/or hardware and configured to maintain mappings specifying the associations between client addresses or address ranges to optimal servers, receives a request for an optimal server for a given client address. The request may come from a variety of entities, such as clients, redirection servers and/or DNS servers. Whatever the source of the request, the Web router returns the address of the optimal server according to the above-mentioned mappings.

In a further embodiment, a number of Web routers are deployed in a network or network of networks and these Web routers communicate with one another using a communications protocol that includes one or more messages transmitted reliably over inter-Web router communication channels called tunnels. The messages carry the mappings specifying the association between clients or client address ranges to available servers. The specific metric associated with the mapping can be one or more of an average delay from the client or client address range to a server, average processing delays at the servers, reliability of a path from client to the server, available bandwidth in such a path, and loads on the server. When these mappings change due to changes in the topology of the internet, the messages carry updated distance information (e.g., as computed according to the metric) in the maps. The Web routers employ special rules when updating their local maps in response to received messages.

In another embodiment, the mappings between clients and servers that the Web routers exchange in order to determine the optimal map between a client and server is derived (at least in part) from an inter-domain routing protocol such as the Border Gateway Protocol (BGP). Likewise, the mappings between clients and servers residing in the same domain may be derived (at least in part) from an intra-domain routing protocol such as the Open Shortest Path First (OSPF) protocol. The interfacing of the inter-domain and intra-domain protocols takes place at special Web routers called anchor Web routers.

As an aside, exterior gateway protocols (like BGP) are designed to route between routing domains. In the terminology of the Internet, a routing domain is called an autonomous system (AS). BGP is an inter-AS routing protocol created for use in the Internet that enables groups of routers (i.e., ASes) to share routing information so that efficient, loop-free routes can be established. BGP is commonly used within and between Internet Service Providers (ISPs) and the complete protocol is defined in Request For Comments 1771 of the Internet Engineering Task Force. Although BGP maintains a routing table with all feasible paths to a particular network, it advertises only the primary (optimal) path in its update messages. The BGP metric is an arbitrary unit number specifying the degree of preference of a particular path. Degrees of preference may be based on any number of criteria, including AS count (paths with a smaller AS counts are generally better), type of link, and other factors.

Returning now to another embodiment of the present invention, the type information associated with different servers may be propagated to others servers in the network. The type information can specify whether the server is a streaming sever, an anchor Web-router, a DNS capable Web router, and so on. Based on this information, mappings are produced to associate the closest optimum server of the required type to service a client or client address range that needs that specific type of service.

In still another embodiment, the server load is folded into the mapping between clients and servers. This produces the effect of load balancing, such that, when the load on the nearest given server is unacceptable, another server is assigned to service the client.

FIG. 1 illustrates an internetwork 100. The methods and systems described herein, which can be implemented in software and/or hardware, enable the direction of clients to either information objects or the caches and servers storing information objects distributed over computer networks such as the internetwork 100 shown in this illustration. One example of an internetwork 100 is the Internet. Other examples include enterprise networks, local area networks, wide area networks, metropolitan area networks and networks of such networks. In the case where internetwork 100 is the Internet, clients 110 will generally access content located at remote servers 170 through a series of networks operated by different providers. For example, clients 110 may have accounts with local ISPs 120 that enable the clients to connect to the Internet using conventional dial-up connections or one of a variety of high-speed connections (e.g., DSL connections, cable connections, hybrids involving satellite and dial-up connections, etc.). ISPs 120, in turn, may provide direct connections to the Internet or, as shown, may rely on other service providers 130, 140, 150 to provide connections through to a set of high-speed connections between computer resources known as a backbone 160. Connecting to a host (e.g., server 170) may thus involve connecting through networks operated by a variety of service providers.

Figure 2:
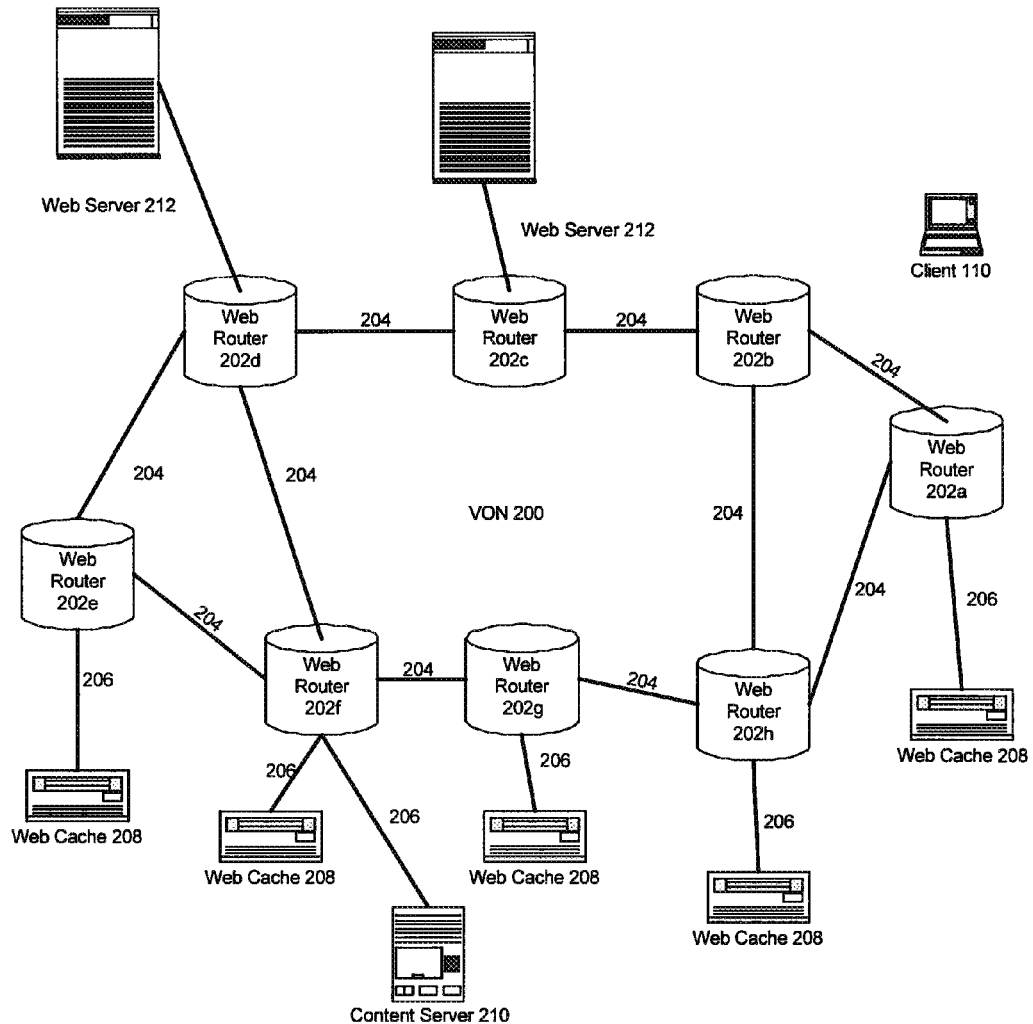
FIG. 2 illustrates a network having a virtual topology of Web routers configured in accordance with an embodiment of the present invention.

FIG. 2 illustrates a virtual overlay network (VON) 200 of Web routers 202a-202h defined on top of the physical topology of an internetwork, such as the Internet, consisting of routers interconnected via point-to-point links or networks. The virtual network of Web routers includes point-to-point links 204 configured between the Web routers, and the links 206 configured between a Web router 202 and one or more Web caches 208 and content servers 210. Such links 204, 206 can be implemented using tunnels (e.g., Internet protocol (IP) tunnels) between Web routers 202 and between Web routers 202 and Web caches 208. As discussed further below, messages can be exchanged between the Web routers 202 via the tunnels. As used herein, the term content server is meant to indicate a server that serves as the origination point for a piece of content (e.g., text, video, audio, etc.) Such content may subsequently be replicated at one or more Web caches 208. As shown in the figure, a client 110 is not necessarily part of the virtual network of Web routers.

As indicated above, a Web router is one embodiment of the systems and methods described herein for directing clients to information objects and object repositories in computer networks. The functionality of a Web router can be co-located and/or implemented as part of a content server 210, a Web server 212, a Web cache 208, a router or as a separate entity. To simplify its description, the Web router is described and treated herein as a separate entity from a Web cache or a router.

In one embodiment of the present invention, a Web router may be implemented in software to be executed by a general purpose (or special purpose) computer processor, or it may be implemented as part of the software of a router or Web cache. In another embodiment of the present invention, some or all of the Web router functionality may be implemented in hardware. Such details are not critical to the present invention.

In one embodiment of the present invention, a collection of one or multiple Web routers 202 is used to refer the request for an object to a Web cache 208 or content server 210 that is able to transfer the requested object to the target client 110 while satisfying a given set of parameters, such as network delays, bandwidth availability, reliability of paths from the chosen sites to the target client 110, and loads on the Web caches 208 and content servers 210. The method used to select the best site from which information objects should be retrieved by user sites (clients) is transparent to the user sites, and the computer network or internetwork over which the system operates need not support multicast delivery to end-user sites.

To reduce communication and processing overhead in Web routers, a topology of Web routers is defined, such that a given Web router has as its neighbor Web routers a subset of all the Web routers in the system (where the term system refers to all or a portion of the VON 200 for Web routers discussed above). A Web router may thus be configured with its set of neighbor Web routers. Such a configuration may be expressed as a table of neighbor Web routers that is defined by a network service provider and/or is dynamically updated. In another embodiment of the present invention, a Web router dynamically selects the set of neighbor Web routers with which it should communicate out of all of the Web routers in the system.

A Web router (WR) preferably communicates with its neighbor Web routers only and uses the Web Information Locator by Distance (WILD) protocol for this purpose. The WILD protocol is disclosed in co-pending and commonly-owned U.S. patent application Ser. No. 09/810,148, entitled "System and Method for Discovering Information Objects and Information Object repositories in Computer Networks", filed Mar. 15, 2001, by J. J. Garcia-Luna-Aceves, the complete disclosure of which is hereby incorporated by reference.

The WILD protocol (or simply WILD) constructs tables (which are stored locally in memory or other computer-readable media) containing the client-to-server distance information. Each Web router uses the tables computed by WILD for directing a client to the server that is nearest to the client. In the present embodiment, the best or nearest server is determined in terms of the distance or network latency (NL) of the server to the client and the current load on the server.

The Web router maps each URL provided by the Web server to the address of a Web cache or the content server that can optimally provide the associated information object to the client. This mapping of URLs to addresses of Web caches or content servers is accomplished by the collaboration among Web routers through WILD. Accordingly, the Web router contacted by the Web server can return the required addresses immediately after processing the request. In turn, the Web server returns a Web page to the requesting client that contains a URL for each information object that points to the nearest Web cache or content server that can provide the information objects to the client. The client is then able to retrieve the information objects referenced in the Web page directly from the identified Web cache, proxy, or content server.

In other embodiments, the Web router may receive a request from a client, a cache, a Web server, another Web router, a name (e.g., DNS) server, or another type of server, and use the address of the client (or a range of client addresses) specified in the request to obtain the address of the nearest Web cache, set of Web caches, content server, or Web router (i.e., information object repository) that should service the client.

In one embodiment, if the Web router maps the address of the client requiring the location of information objects to addresses of Web caches that do not currently store such objects, the Web router can instruct the corresponding Web caches to obtain a copy of the required objects immediately after it provides the requesting Web server the address of such a Web cache or proxy. In another embodiment, a Web cache or proxy attempts to retrieve a requested object from another Web cache or a content server only after it is contacted by a client and determines that a copy of the requested information object is not available locally. In both instances, the Web router provides the Web cache servicing a client request with the address of the nearest Web cache that stores the information object requested by the client; therefore, the Web cache needing the information object communicates directly with the Web cache storing the requested information object, without having to go through any intermediate Web caches and without having to know the content stored in all other Web caches.

Maintaining optimum server information on a per-client basis is expensive and (in many cases) unnecessary. It is generally sufficient to maintain the optimum server on a per-subnet basis, where a subnet is defined by its prefix and mask. The subnet-to-server mapping information is determined at the special Web routers, called the anchor Web Routers, which are BGP-enabled and are capable of receiving Internet connectivity information (e.g., ASPATHs, etc.) from the external BGP peers running in the host autonomous system (AS). Anchor Web routers are those that originate the mapping information for a given client or client address range.

In order to provide the sort of functionality discussed above, each Web router executes locally a path-selection algorithm, such as Dijkstra's shortest-path first algorithm, to compute the local distance from attached Web caches to each client address range if the Web router has complete intra-domain and inter-domain routing data, or to each client address range in the local AS if the Web router only has intra-domain routing data. A Web router can execute a different path-selection algorithm to compute local distances to address ranges for each defined in the system.

Having computed local distances from attached Web caches to all or a subset of client address ranges, a Web router uses this information to compute the best match between a client address range and the set of Web caches that should serve the client address range because they have the best distance to the client. To accomplish this process, for each known destination address a Web router maintains a set of one or more addresses of the Web caches or content servers that have the best distances to the destination address and the value of such distances, and may also maintain the address of one or more Web routers that can be used to redirect requests from clients in the address range and the value of the distances from the redirecting Web routers to the client address range.

Figure 3:
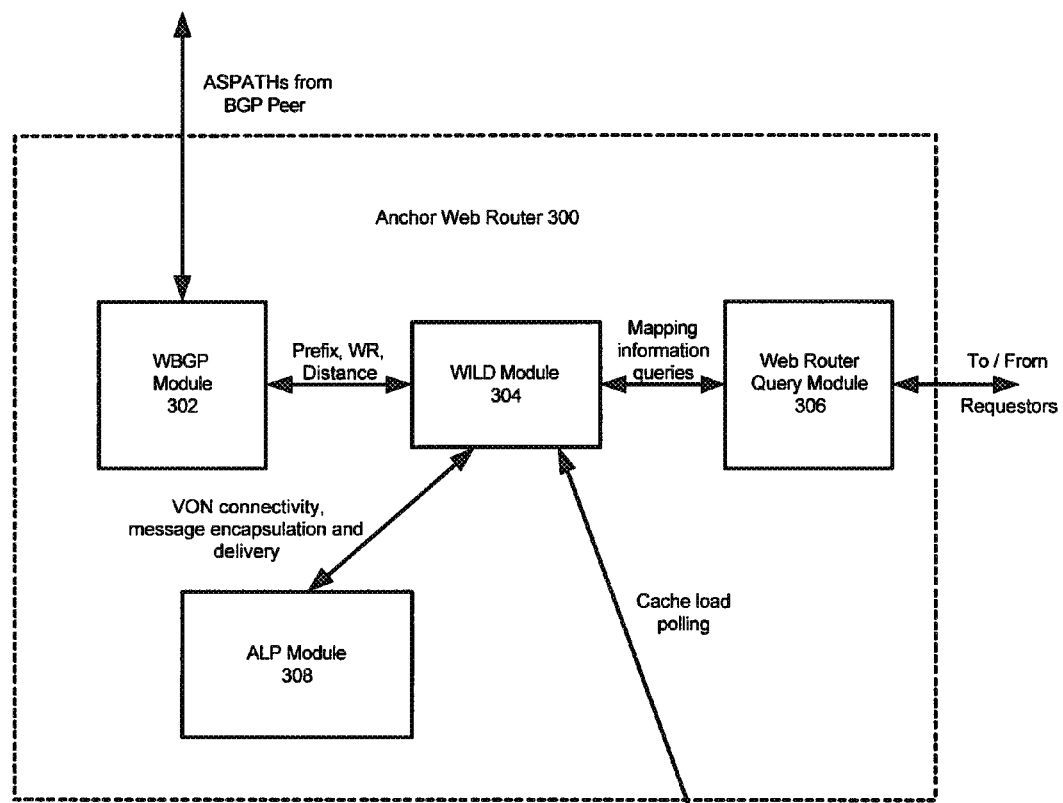
FIG. 3 illustrates a functional representation of an anchor Web router configured in accordance with an embodiment of the present invention.
Figure 3:
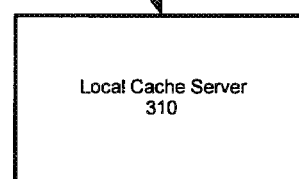

Turning now to FIG. 3, a functional representation of an anchor Web router 300 is illustrated. Non-anchor Web routers are similar to anchor Web routers 300, but need not include the WBGP module 302. In each anchor Web router 300, however, a WILD-BGP (WBGP) module 302 converts the ASPATH information obtained from BGP peers, together with on-line latency measurements performed by a WILD module 304, into subnet-to-Web router latency information, known as "NL maps". Note throughout the remaining discussion, where the term subnet is used it should be understood that a subnet may be a single client or, preferably, a range of client addresses identified by the prefix and mask. The anchor Web routers 300 then propagate NL maps extracted from the ASPATH information to the respective Web routers. Each Web router will then know its network latency to each subnet. At each Web router, the load of the local servers 310 is added to the NL map information to produce the subnet-to-server latency information. The final output of the WILD protocol module 304 is to install, at each Web router, a mapping table with entries of the form [subnetid, serverid], where serverid is the address of the server that is best suited to service requests from clients in the subnet defined by subnetid.

The following is an example of an API that could be used for the interfacing of the WBGP module 302 to the WILD module 304.

| | |
|---|---|
| Function name | wldAlgNewMap |
| Return value | void |
| Paramters | IpAddr prefix |
| | IpAddr mask |
| | IpAddr mcaddr |
| | MCType type |
| | Distance dist |
| Description | Called by WBGP to provide a new NL map to WILD. mcaddr specifies the subject Web router and dist specifies the distance of the prefix to the subject Web router. |
| Function name | wldDeletePrefix |
| Return value | void |
| Parameters | IpAddr prefix |
| | IpAddr mask |
| Description | Called by WBGP to inform WILD that the specified prefix is no longer valid. |
| Function name | wldBgpWridState |
| Return value | void |
| Parameters | IpAddr mcaddr |
| | Flag flag |
| Description | A WBGP routine that is called by WILD to indicate that it is interested in receiving maps related to the specified Web router (mcaddr). |
| Function name | wldAddrToPrefix |
| Return value | void |
| Parameters | IpAddr mcaddr |
| | IpAddr *prefix |
| | IpAddr *mask |
| Description | A WBGP routine that WILD calls to obtain the network address of the client specified in mcaddr. |
| Function name | wldAddrPrefix |
| Return value | void |
| Parameters | IpAddr *prefix |
| | IpAddr *mask |
| Description | A WBGP routine WILD calls to add the network address to the BGP database so that the network of a given client address can be determined. This is used at the non-anchor Web routers. |

The WBGP module 302 is supported by the WLM module, which provides realistic link metrics to WBGP to augment the AS hop-count metric of WBGP. In addition to the WBGP module 302, the anchor Web routers 300 each include a WILD protocol module 304. The WILD protocol module 304 uses the WBGP module 302 to communicate with the external BGP router(s) in the host AS to obtain the ASPATH information and generate the NL maps. As part of this process, the WILD protocol module's WLM module (not shown in detail) converts the ASPATH information to a latency metric.

The WILD protocol module 304 further uses an Adaptive Link-State Protocol or ALP (see, J. J. Garcia-Luna-Aceves and M. Spohn, "Scalable Link-State Interface Routing," Proc. IEEE International Conference on Network Protocols (ICNP 98), Austin Tex., Oct. 14-16, 1998, incorporated herein by reference) module 308 for obtaining VON connectivity and Web router reachability information. It also uses ALP messages to encapsulate and deliver its own WILD messages. Other routing protocols can be used instead of ALP, provided that the protocol does not create permanent or long-term loops after link cost increases or resource failures.

The ALP module 308 reports distances to the WILD module 304, so that the WILD module 304 knows about unreachable anchor Web routers while determining validity of NL maps and WILD maps (see below). One application programming interface (API) for integrating the WILD module 304 with the ALP module 308 resembles the following:

| | |
|---|---|
| Function name | wldAlpInit |
| Return value | void |
| Paramters | IpAddr hostAddr |
| Description | Called by ALP to initialize WILD with the address of the host Web router |
| Function name | wldAlpMcState |
| Return value | void |
| Parameters | IpAddr mcaddr |
| | McType mctype |
| | Flag isnbr |
| | Flag state |
| | Distance dist |
| Description | Called by ALP to indicate the status of a Web router. mctype specifies the types associated with the device. dist specifies the distance of the subject Web router identified by the MAC address (mcaddr) to this Web router. state specifies if the Web router is operational or not and isnbr indicates whether the subject Web router is a neighbor. |

The WILD protocol module 304 also uses a Web router interface (WRI) to obtain server-load information from the server 310. This server load information is subsequently used by the WILD protocol module 304 for generating WILD maps. More particularly, the WRI module (not shown in detail, as the WRI may be included in WILD module 304) informs the WILD module 304 about the status and load of the local server(s) 310. The WRI module periodically polls the local server(s) 310 to obtain the load information. If the server 310 fails, a load of infinity is reported to the WILD module 304. An API for interfacing the WILD module 304 with the WRI is as follows:

| | |
|---|---|
| Function name | wldCacheLoadNotify |
| Return value | void |
| Parameters | IpAddr caddr |
| | Distance dist |
| Description | Called by WRI to inform WILD of change in the load (dist) of a server identified by caddr. A load value of infinity is reported if the server has failed. |

The WILD protocol module 304 further interacts with a Web router query (WRQ) module 306 in directing clients to optimum servers. The Web router responds to queries from the WRQ module 306. The queries can be for the nearest server, redirector, DNS server or another Web router. AN API for this interface is:

| | |
|---|---|
| Function name | wldGetClosestCache |
| Return value | void |
| Parameters | unit32 count |
| | IpAddr caddr |
| | unit32 *error |
| | IpAddr *list |
| Description | Called by WRI to obtain information regarding the closest server for a client (caddr). |

Each Web router runs the WILD protocol (to allow for the above-described mappings of subnets to servers) and exchanges WILD messages with neighbor Web routers to construct the WILD tables. The WILD messages primarily carry the subnet-to-Web router and subnet-to-server mapping information. As indicated above, a subnet is defined by a network prefix and a mask, and the map information related to a subnet applies to all clients with addresses that belong to that subnet. The messages are exchanged as payloads of control messages of the underlying ALP.

In one embodiment, ALP is implemented in GateD and runs on each Web router. GateD is a commercially available, modular software program that includes certain core services, a routing database and various protocol modules supporting multiple routing protocols. GateD and GateD-based products are available from NextHop Technologies, Inc. of Ann Arbor, Mich. ALP notifies the WILD protocol module 304 as distances to various Web routers and servers change.

Figure 4:
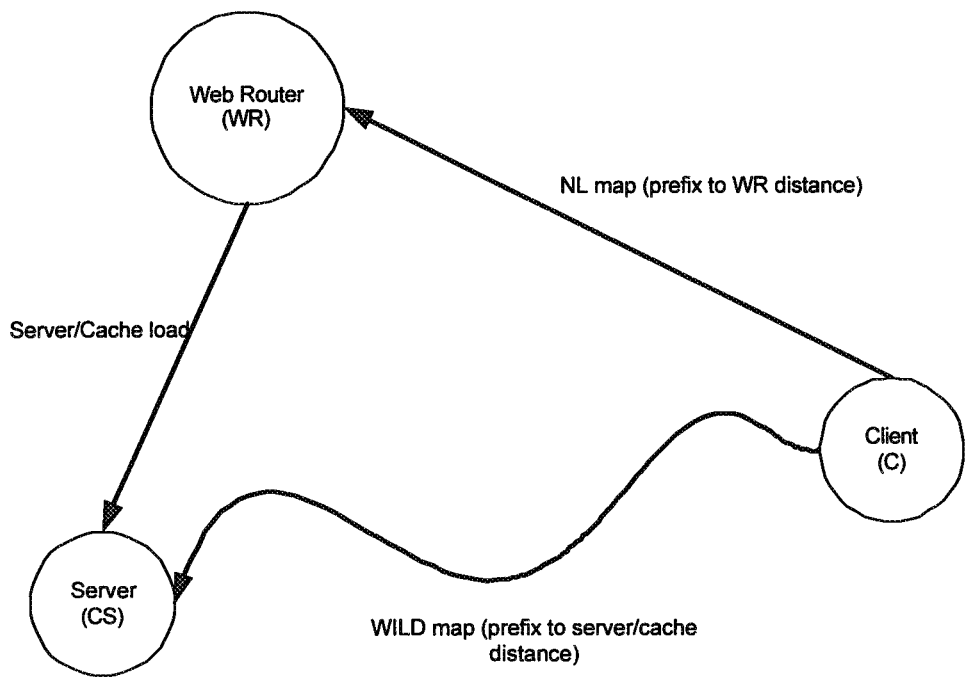
FIG. 4 illustrates graphically the relationship between subnet-to-server latency, subnet-to-Web router latency and server-load latency as used in accordance with an embodiment of the present invention.

When a Web router receives a WILD message it first validates the message contents using sequence numbers, and then updates its tables based on distance. The end result is that the WILD tables at each Web router converge to the closest subnet-to-server mappings. As mentioned earlier, the subnet-to-server latency is sum of the subnet-to-Web router latency and the server-load latency and is graphically depicted in FIG. 4. All measured network latencies and server latencies are converted to common metric called Cenus Metric Units (CMUs). The subnet-to-Web router and subnet-to-server distances or latencies are thus measured in CMUs. When queries (issued by the WRQ module 306) for a nearest server, redirector, etc. are received, the Web router performs a table lookup using the WILD tables and returns the requested information.

Thus far, the description has indicated the use of various tables and maps (i.e. table entries). The following notation will be used below in describing these tables and maps in more detail.

prefix, mask: Together they define a subnet in the Internet
cs: Address of a server
wr: Address of a web router
asn: The AS number of a WR
dist: Distance specified in CMUs
anch: Address of an anchor web router
seq: Sequence number
load: Load on a server specified in CMUs The following are the key tables maintained at a Web router. These tables include entries that are referred to as maps.

Network Latency (NL) Tables: A table entry is of the form [prefix, mask, wr, dist, anch, seq] and is referred to as a map. It specifies the distance between the subnet defined by prefix and mask to the Web router wr as reported by the anchor anch. seq is the sequence number assigned by anch to this information. The distance dist measured in CMUs includes only the network latency and not the latency of the server. The table holds only the best map among all the maps reported by the anchor Web routers for each subnet.

Server Load (CL) Table: Contains the load information of the local servers. A table entry is of the form [cs, load], where cs is the address of the local server and load is the server latency measured in CMUs. Each time load on a local server changes, the corresponding table entry is updated and a WILD event is triggered. A WILD event may be propagation of a map as part of one or more of the updates described below for Procedure WILD.

WILD Table: The table entry is of the form [prefix, mask, cs, dist. anch, seq]. The entry states that cs is the most favored server that can service the subnet specified by prefix and mask. The distance dist is measured in CMUs and is the sum of the network latency and the server latency, seq is the sequence number assigned by the web router to this information when it is advertised. This table is updated in response to WILD updates received from neighbors, local server load changes and NL map updates received from anchors.

Machine (MC) Table: This is a compound table that holds information regarding local servers and remote Web routers. For local servers, the table includes the server load information. For Web routers, it includes type information, such as whether the Web router is an anchor, a redirector, etc. The table entry is of the form [mc/cs, flags, type/load]. mc is the address of a Web router and cs is the address of a server, depending upon which form of entry is referenced. The flags field indicates whether the identified device (i.e., server or Web router) is operational or not, etc. The type/load field indicates for a Web router whether that device is an anchor web router, a redirector etc., and for a local server specifies the load on that server.

The WILD messages are exchanged between Web routers as payload information in ALP messages. Each WILD message has one or more WILD updates whose packet data units (PDUs) contain one or more NL and/or WILD updates. An NL update entry is of the form [prefix, mask, wr, dist, anch, seq], and thus carries information contained in an entry of an NL table. An example of a PDU for an NL-map update is:

| prefix | mask | wr | dist | anch | seq |
|---|---|---|---|---|---|
| (32 bits) | (32 bits) | (32 bits) | (32 bits) | (32 bits) | (48 bits) |

A WILD update entry is of the form [prefix, mask, cs, dist, anch, seq]. A WILD update thus carries information contained in an entry of a WILD table. Examples of PDUs for a WILD update are:

| prefix | mask | wr | dist | anch | | seq |
|---|---|---|---|---|---|---|
| (32 bits) | (32 bits) | (32 bits) | (32 bits) | (32 bits) | | (48 bits) |
| prefix | mask | wr | dist | anch | asn | seq |
| (32 bits) | (32 bits) | (32 bits) | (32 bits) | (32 bits) | (32 bits) | (48 bits) |

The above-described update messages are used to determine whether or not the corresponding map entries in the NL and WILD tables should be updated. The WILD protocol module 304 handles this process. The following pseudocode describes the handling of various events that are received by the WILD protocol module 304. Flow charts are also provided to illustrate these procedures, which may each be implemented as a subroutine that may be called as the triggering events occur.

Figure 5:
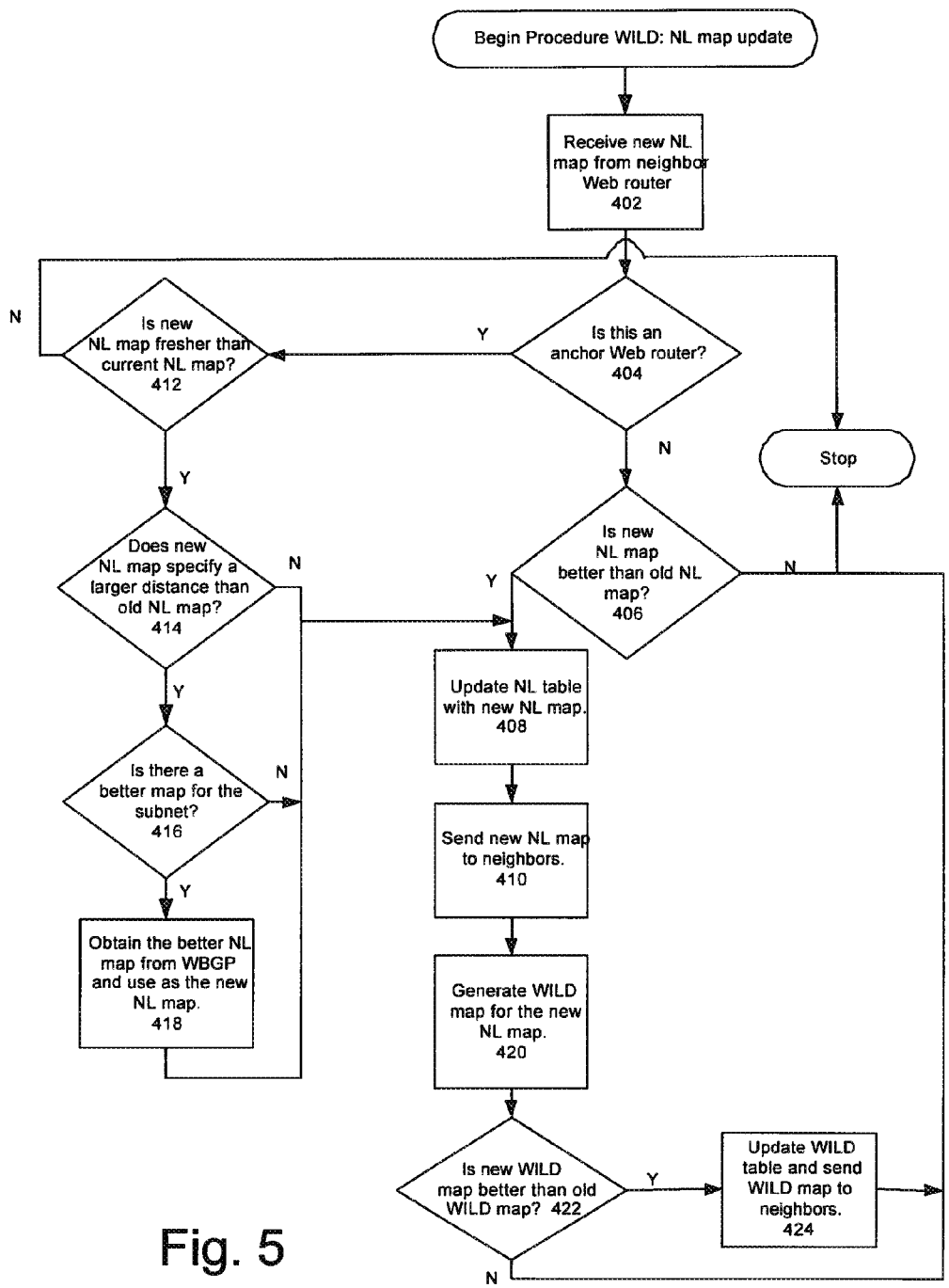
FIG. 5 illustrates a process for handling an NL map update received from a neighbor Web router in accordance with an embodiment of the present invention.
Figure 6:
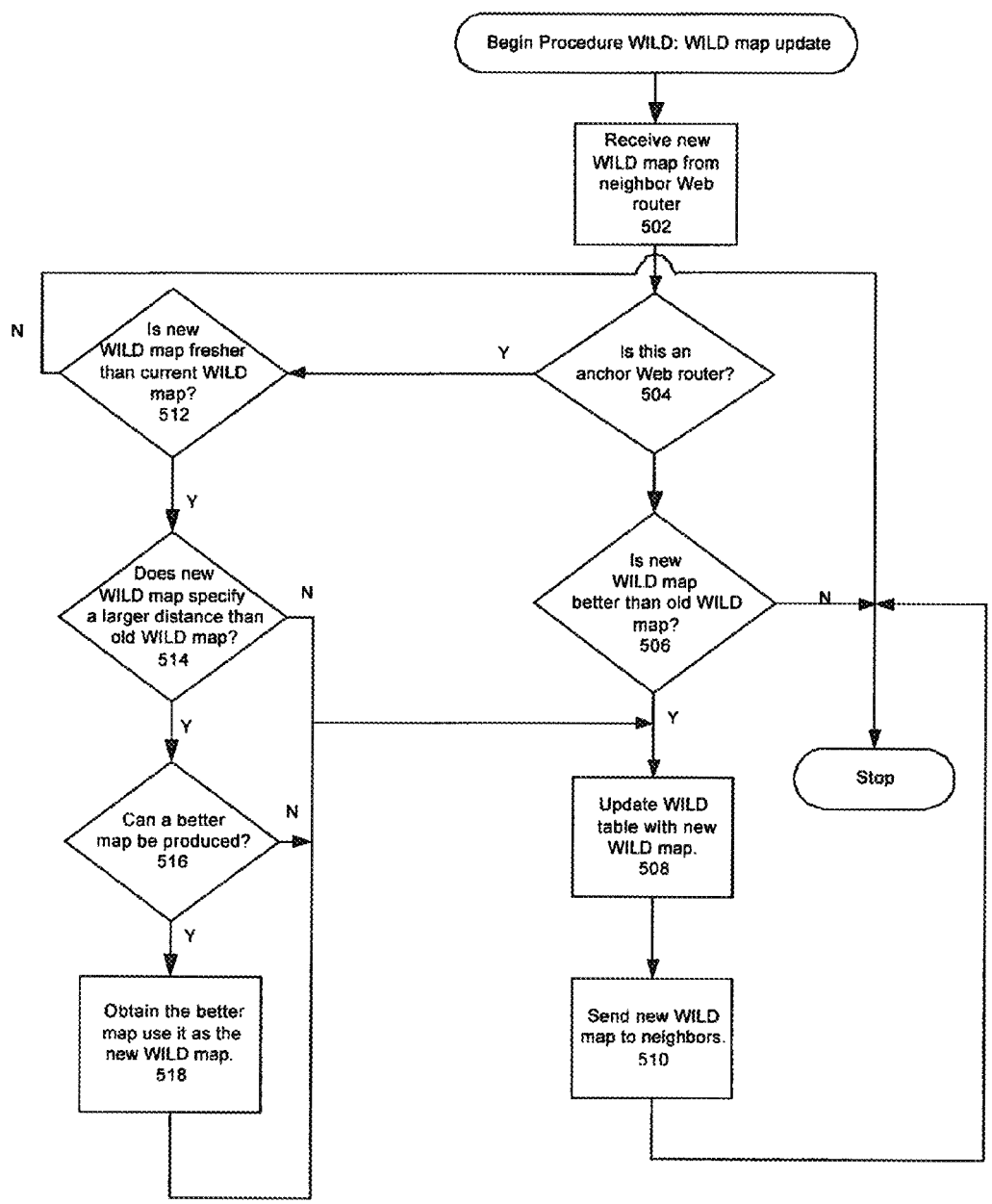
FIG. 6 illustrates a process for handling a WILD map update received from neighbor Web router in accordance with an embodiment of the present invention.
Figure 7:
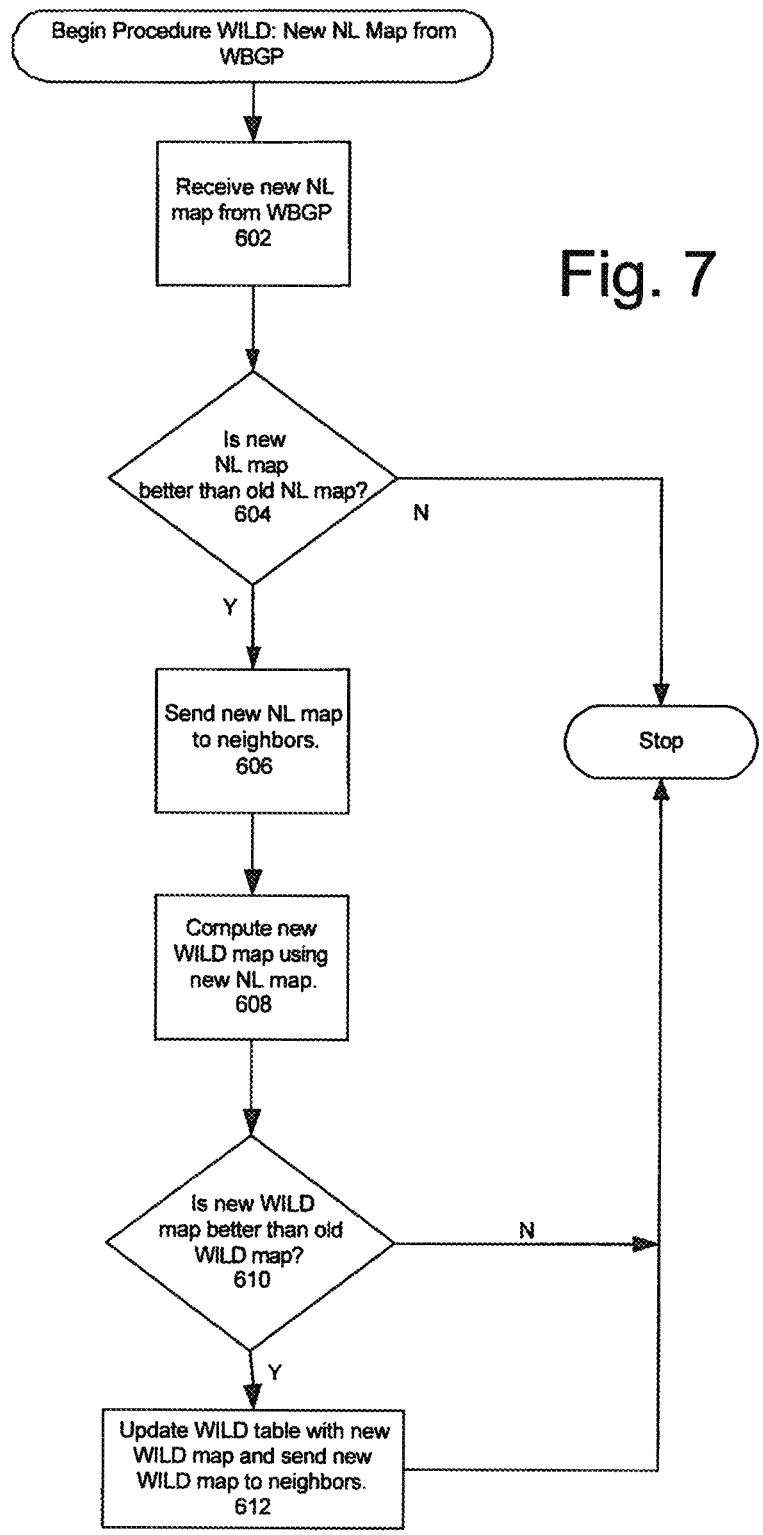
FIG. 7 is a flow chart illustrating a procedure to be followed when a new NL map for a subnet is obtained from a WBGP module in accordance with an embodiment of the present invention.
Figure 8:
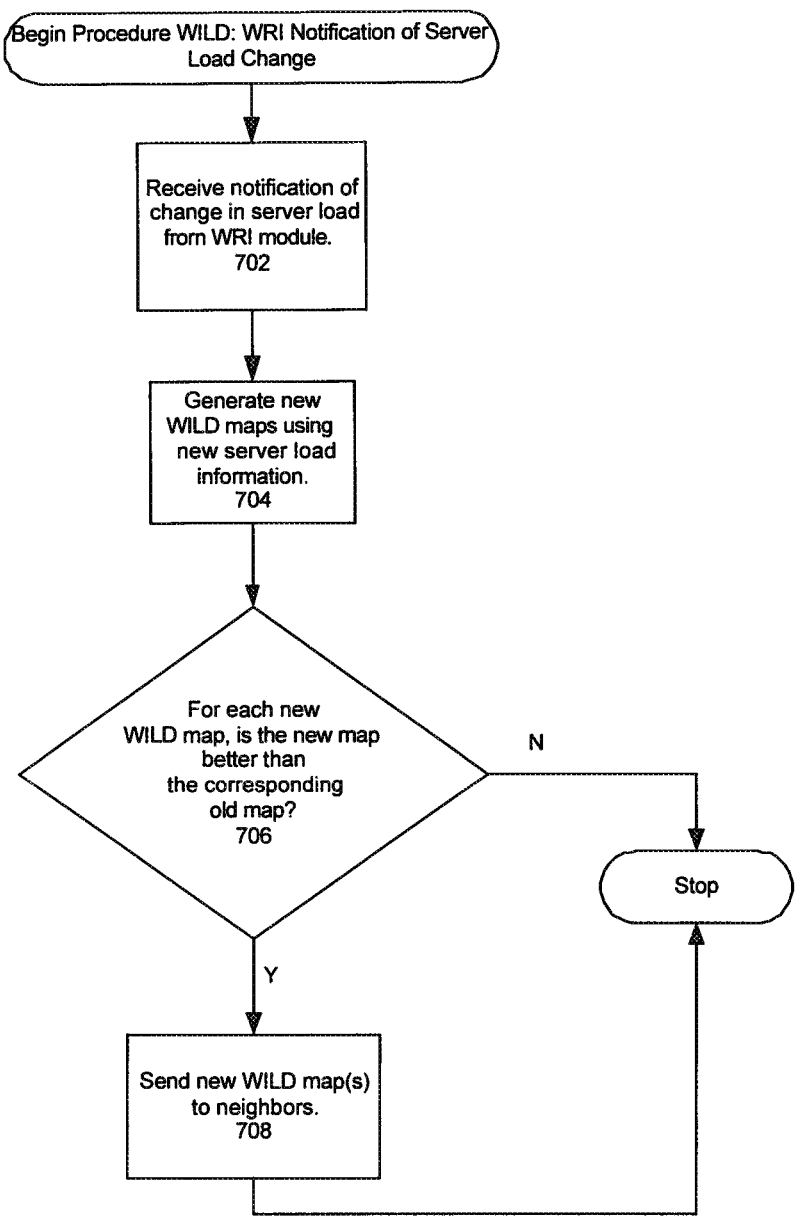
FIG. 8 is a flow chart illustrating a procedure to be followed when a WRI module notifies a WILD module of a change in server-load in accordance with an embodiment of the present invention.

Procedure WILD:
1. An NL map update is received from a neighbor Web router. The corresponding flow chart is shown in FIG. 5.
   (a) The incoming map is received at step 402 and compared with the corresponding map in the NL table using the map precedence rules described below (step 406). If the incoming map is a better map, the NL table is updated with the new map (step 408) and the map is propagated to neighbor Web routers (step 410).
   (b) It should be noted that a variation on the above process is used if the new NL map is received at an anchor Web router. If the receiving Web router is an anchor (step 404), and if the incoming map is newer (fresher) than the map in the NL table (step 412), but specifies a larger distance (step 414), the local WBGP module is consulted to determine whether there is a better map for the subnet (step 416). If there is a better map, that NL map is obtained from the WBGP module (step 418) and the NL table is updated with the better NL map. The better NL map is then propagated to neighbor Web routers.
   (c) Finally, if the NL table is updated for this subnet, a WILD map is generated for this NL map by adding the load of the local server (step 420). If the generated WILD map is better than the corresponding one in the WILD table (step 422), the WILD table is updated and the map is propagated to neighbor Web routers (step 424).
2. A WILD map update received from neighbor Web router. The corresponding flow chart is shown in FIG. 6.
   (a) The WILD map received at step 502 is compared with the corresponding map in the WILD table (after validation using sequence numbers) using the map precedence rules described below (step 506). If the incoming WILD map update is a better map, the WILD table is updated (step 508) and the better map is propagated to neighbor Web routers (step 510).
   (b) It should be noted that a variation on the above process is used if the new WILD map is received at an anchor Web router. If the receiving Web router is an anchor (step 504), and if the incoming WILD map is a newer (fresher) (step 512) but specifies larger distance (step 514), the local NL and CL tables are consulted to determine whether a better WILD map can be produced by adding the NL distance to server load (step 516). If this check succeeds in a better map being generated (step 518), the WILD table is updated with the better map and that better map is propagated to neighbor Web routers.
3. A new NL map for a subnet is obtained from a WBGP module. FIG. 7 is the corresponding flow chart.
   (a) The new NL map received from the WBGP module 304 (step 602) is first compared with the corresponding one in the NL table using the precedence rules described below (step 604). If the new NL map is better, the new NL-map is propagated to the neighbor Web routers (step 606), otherwise it is ignored.
   (b) If the new NL map is better than the corresponding one in the NL table, a new WILD map is generated by adding its distance to the server load of the local server (step 608). The new WILD) map is then compared with the current best corresponding map in the WILD table (step 610). If the newly generated map is better, the WILD table is updated and the new map is propagated to neighbor Web routers (step 612), otherwise it is ignored.
4. The WRI module notifies the WILD module of a change in server-load. FIG. 8 illustrates the corresponding flow chart.
   (a) A notification of a change in server load is received by WILD module 304 at step 702. When local server load changes, new WILD maps are generated by adding the server load to all maps in the local NL table that refer to the local Web router (step 704).
   (b) Each new map is then compared with the corresponding map in the WILD table (step 706). If the new map is better, it is propagated to neighbor Web routers (step 708), otherwise it is ignored.

end WILD

The rules for determining map precedence may be understood as follows. Let $\alpha=[p, m, w, d, a, s]$ and $\beta=[p, m, w^1, d^1, a^1, s^1]$ be two NL maps of particular subnet with prefix p and mask m. w and $w^1$ are corresponding Web router addresses in the two NL maps. Similarly, d and $d^1$ are distances, a and $a^1$ are the anchor addresses, and s and $s^1$ are the sequence numbers. The precedence between NL maps x and y is defined as follows:

1. If $w=w^1$, $a=a^1$ and $s>s^1$, then $\alpha$ has higher precedence than $\beta$.
2. If $w=w^1$, $a=a^1$ and $s<s^1$, then $\beta$ has higher precedence than $\alpha$.
3. If $w\neq w^1$, or $a\neq a^1$ and $d<d^1$, then $\alpha$ has higher precedence than $\beta$.
4. If $w\neq w^1$ or $a\neq a^1$ and $d>d^1$, then $\beta$ has higher precedence than $\alpha$.
5. If $w\neq w^1$ or $a\neq a^1$ and $d=d^1$, then let $h=f(p,m,w)$ and $h^1=f(p,m,w^1)$, where f(.) is a hash fashion.
   a. If $h<h^1$, then $\alpha$ has higher precedence than $\beta$, and if $h>h^1$, then $\beta$ has higher precedence than $\alpha$.
   b. If $h=h^1$ and $a<a^1$, then $\alpha$ has higher precedence than $\beta$.
   c. If $h=h^1$ and $a>a^1$, then $\beta$ has higher precedence than $\alpha$.
   d. If $h=h^1$ and $a=a^1$, compare w and $w^1$. If $w<w^1$ than $\alpha$ has higher precedence than $\beta$, and if $w>w^1$, $\beta$ has higher precedence than $\alpha$.

The above precedence rules strictly order the two given maps. If two maps have the same precedence, then they are identical. The hashing technique is designed to achieve load balancing by distributing subnets evenly among several equidistant servers.

The same precedence rules apply for comparing WILD maps. For WILD maps, however, w and $w^1$ are the server addresses, and a and $a^1$ are the addresses of the Web routers to which the servers are attached.

Now that the processes for updating maps have been described, we return to the procedures for creating the maps in the first place. NL maps are created at anchor Web routers. Recall that an anchor is a Web router that has a BGP feed from its host AS. For a given Web router, the WBGP module of the anchor Web router associated with that Web router searches the BGP ASPATH database and generates NL maps between the Web router and all the subnets. Ideally, an anchor will produce NL maps for only those Web routers that are in the same AS. This will be efficient, as it reduces number of map updates that are generated.

Sometimes, however, an AS that has one or more Web routers may not be able to provide BGP feeds to any of those Web routers. These Web routers, which we call "orphan Web routers", thus have to depend on anchors in other ASes for their NL maps. So, it is sufficient for each anchor Web router to generate NL maps for Web routers in the set $W=W_{as}\cup W_{orph}$, where $W_{as}$ is the set of Web routers in the same AS as the anchor and $W_{orph}$ is the set of all orphan Web routers.

Figure 9:
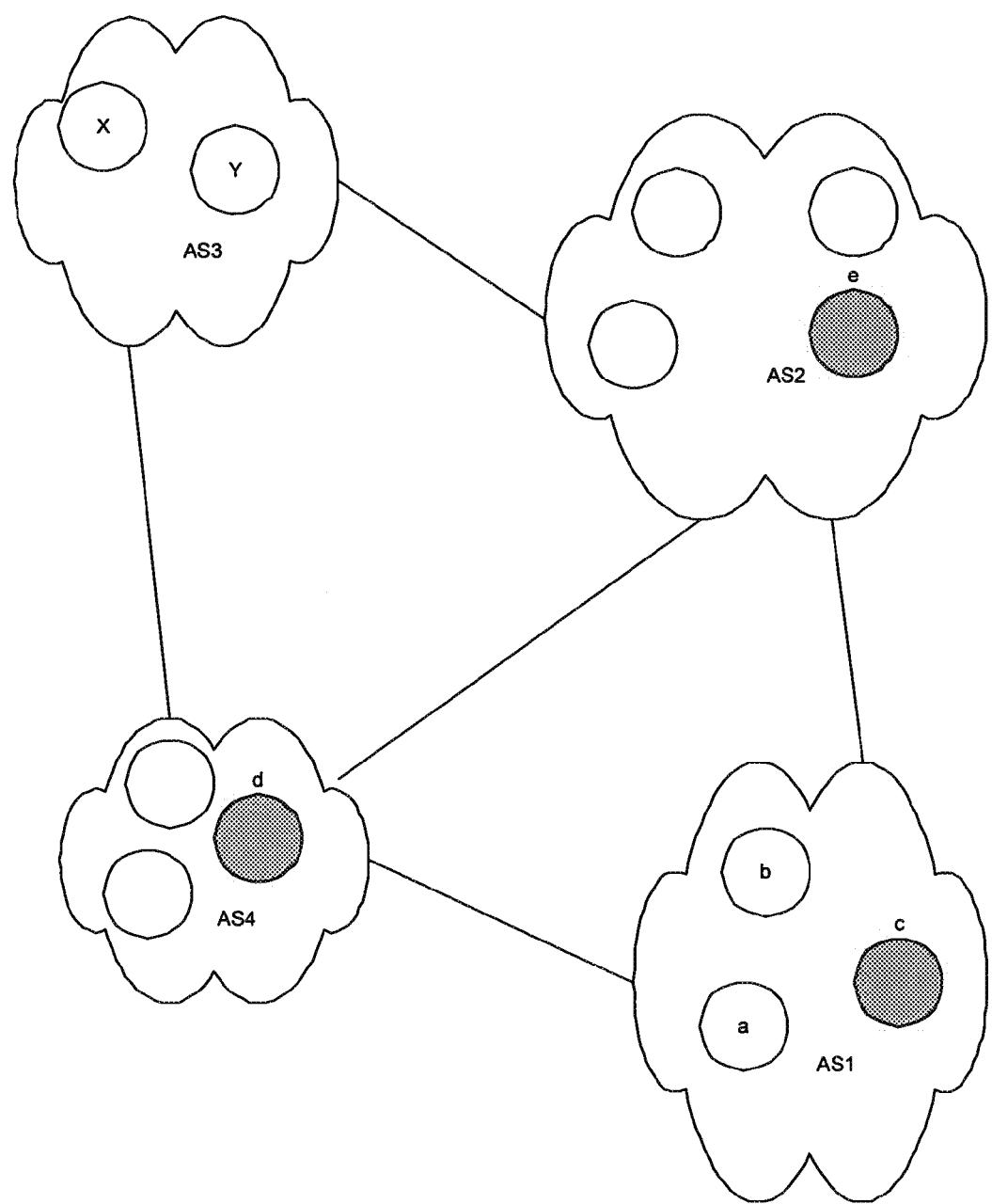
FIG. 9 illustrates graphically a collection of Web routers in different autonomous systems (ASes) and related anchor Web routers therefor as determined in accordance with an embodiment of the present invention

To illustrate the sets W, $W_{as}$ and $W_{anch}$, consider the Web routers shown in FIG. 9. The Web routers c, e and d in AS1, AS2 and AS4, respectively, are anchors and receive BGP feeds from their host ASes. These anchors generate NL maps for all the web routers in the same AS. For example, the Web router c in AS1 generates maps for a, b and c. As there is no anchor web router in AS3, the Web routers x and y in AS3 are considered orphan Web routers. Anchors in other ASes generate NL maps for these orphan web routers. So for example, the anchor c generates NL maps for a, b, c, x, and y. It does not, however, generate maps for Web routers in AS2 and AS4, as they are provided for by the anchors e and d respectively.

We now describe how the set $W=W_{as}\cup W_{orph}$ is computed at an anchor, assuming the anchor has a list of all anchor web routers available. How the list of anchors is constructed is described subsequently.

Once an anchor constructs a list of known anchors, it can construct the list $W_{orph}$ as follows:

1. Using the local BGP information, find each Web router's AS number.
2. "Mark" all Web routers that have the same AS number as one of the anchor Web routers.
3. The "unmarked" Web routers form the orphan set $W_{orph}$.

An anchor generates maps for each Web router in this orphan set if it is in the AS that is closest to the orphan's AS. In addition that anchor Web router generates maps for all Web routers in its own AS, i.e., the set $W_{as}$. The anchor list is constructed using an Anchor-Type Protocol (ATP), which is described below.

1.

Once the anchor Web routers have been identified, they can proceed to generate NL maps. Given a set of prefixes and their ASes, a set of Web routers, and a set of ASPATHs, the NL maps are generated as follows:

1. For all prefixes and Web routers in the same AS, generate maps using an inner gateway protocol (IGP) database.
2. For each prefix and each Web router that does not belong to the same AS, generate maps using the BGP database.

Each of the above items (i.e., prefixes and their ASes, a set of Web routers, and a set of ASPATIHs) is dynamic and can change. The following rules describe adaptations that need to be made in response to these dynamic changes.

1. When a new prefix is discovered, update the list of Web routers (e.g., in a Web router table) and generate NL maps accordingly.
2. When a prefix is deleted, find a new prefix for corresponding Web routers and generate NL maps for those Web routers.
3. When a new Web router is discovered, check to see if it is an anchor or a Web router in the same AS. If it is not, generate NL maps accordingly.

As indicated above, one mechanism for constructing an anchor list is to use the Anchor-Type Protocol to propagate Web router type information. Each Web router receiving this information adds the new Web router to its list of anchors. The type (e.g., anchor or not) of a Web router can be explicitly configured through an ALP configuration file or implicitly determined through automatic detection of a BGP peering relationship. ATP can be realized through various methods tone such method utilizes the following rules:

1. At initialization, each Web router sends its own type information (preferably tagged with a sequence number) to each of its neighbors.
2. When a Web router discovers a neighbor, the Web router transmits its list of Web routers and their types to the new neighbor. Thus, each Web router maintains a Web router table that includes the type information.
3. When a Web router receives a Web router type update, the sequence number is used to validate the update. For a valid update, the Web router uses the update to modify a Web router type table appropriately. If the update is newer it is forwarded to the neighbors of the Web router.

Another method for realizing ATP is to use the underlying routing protocol, ALP.

Thus, a scheme for directing clients to optimal serves has been described and although the foregoing description and accompanying figures discuss and illustrate specific embodiments, the present invention is to be measured only in terms of the claims that follow, and their equivalents.

What is claimed is:

1. A method, comprising:
   receiving, at a first Web router, an inter-Web router communication message including an updated client-to-Web router network latency map between a client and a second Web router; and
   updating at the first Web router, a client-to-Web router table based on network map precedence rules that comprise:
   comparing the first Web router address associated with the client-to-Web router network latency map that is maintained in the client-to-Web router table of the first Web router with the second Web router address of the updated client-to-Web router network latency map,
   comparing sequence numbers of the client-to-Web router network latency map that is maintained in the client-to-Web router table and the received message of the updated client-to-Web router network latency map,
   selecting the client-to-Web router network latency map maintained in the client-to-Web router table when the first and second Web router addresses match and the client-to-Web router network latency map has a higher sequence number than the received message of the updated client-to-Web router network latency map; if the received message of the updated client-to-Web router network latency map has a higher sequence number, selecting the updated client-to-Web router network latency map to replace the client-to-Web router network latency map maintained in the client-to-Web router table of the first Web router, and
   comparing the client-to-Web router distance between the client and the second Web router that is currently maintained in the client-to-Web router table of the first Web router with the client-to-Web router distance of the updated mapping in the updated client-to-Web router network latency map when the first Web router address differs from the second Web router address,
   updating at the first Web router, the client-to-Web router table to include the updated client-to-Web router network latency map between the client and the second Web router if the updated client-to-Web router network latency map specifies a better client-to-Web router distance than is currently maintained in the client-to-Web router table at the first Web router;
   wherein the first Web router communicates messages using a Web information Locator by Distance (WILD) protocol with neighbor Web routers including the second Web router within a virtual overlay network of the Web routers that is defined on top of an internetwork, wherein the client refers to any information object requesting device or group thereof, communicatively coupled to at least one of the first and second Web routers.

2. The method of claim 1 further comprising propagating the network latency map between the client and the second Web router to neighbor Web routers of the first Web router.

3. The method of claim 1 further comprising using the network latency map between the client and the second Web router to compute a client-to-server mapping.

4. The method of claim 3 further comprising updating, at the first Web router, a client-to-server table to include the client-to-server mapping if the client-to-server mapping specifies a better client-to-server distance than is currently maintained in the client-to-server table for the client.

5. The method of claim 4 further comprising propagating the client-to-server mapping to neighbor Web routers of the first Web router.

6. The method of claim 3 wherein the client-to-server mapping is computed by adding server load to distance information included in the client-to-Web router network latency map.

* * * * *